US011267917B2

United States Patent
Joung et al.

(10) Patent No.: US 11,267,917 B2
(45) Date of Patent: *Mar. 8, 2022

(54) HYBRID CATALYST COMPOSITION, PREPARATION METHOD THEREFOR, AND POLYOLEFIN PREPARED USING SAME

(71) Applicant: Hanwha Chemical Corporation, Seoul (KR)

(72) Inventors: Ui Gab Joung, Daejeon (KR); Dong Wook Jeong, Daejeon (KR); Ah Reum Kim, Gyeonggi-do (KR); Seung Il Choi, Jeollanam-do (KR)

(73) Assignee: Hanwha Chemical Corporation, Seoul (KR)

( * ) Notice: Subject to any disclaimer, the term of this patent is extended or adjusted under 35 U.S.C. 154(b) by 229 days.

This patent is subject to a terminal disclaimer.

(21) Appl. No.: 16/083,125

(22) PCT Filed: Mar. 22, 2016

(86) PCT No.: PCT/KR2016/002842
§ 371 (c)(1),
(2) Date: Jan. 10, 2019

(87) PCT Pub. No.: WO2017/155149
PCT Pub. Date: Sep. 14, 2017

(65) Prior Publication Data
US 2019/0135961 A1 May 9, 2019

(30) Foreign Application Priority Data
Mar. 9, 2016 (KR) .................. 10-2016-0028278

(51) Int. Cl.
| | |
|---|---|
| *C08F 4/64* | (2006.01) |
| *C08F 4/642* | (2006.01) |
| *C08F 210/16* | (2006.01) |
| *C08F 10/00* | (2006.01) |
| *C08F 4/6592* | (2006.01) |
| *C08F 2/00* | (2006.01) |
| *C08F 4/659* | (2006.01) |

(52) U.S. Cl.
CPC .............. *C08F 210/16* (2013.01); *C08F 2/00* (2013.01); *C08F 4/642* (2013.01); *C08F 4/6592* (2013.01); *C08F 10/00* (2013.01); *C08F 4/65912* (2013.01); *C08F 4/65916* (2013.01); *C08F 2420/01* (2013.01); *C08F 2420/03* (2013.01); *C08F 2800/10* (2013.01)

(58) Field of Classification Search
CPC .............. C08F 2420/01; C08F 2420/03; C08F 4/65927; C08F 4/65925; C08F 4/6592; C08F 4/65904; C08F 4/65912
See application file for complete search history.

(56) References Cited

U.S. PATENT DOCUMENTS

| | | | |
|---|---|---|---|
| 4,935,474 A | 6/1990 | Ewen et al. | |
| 5,272,236 A | 12/1993 | Lai et al. | |
| 5,914,289 A | 6/1999 | Razavi | |
| 5,973,083 A | 10/1999 | Matsushita et al. | |
| 6,525,150 B1 | 2/2003 | Hayakawa et al. | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 2003/0060579 A1 | 3/2003 | Oshima et al. | |
| 2004/0138392 A1 | 7/2004 | Jiang et al. | |
| 2004/0214953 A1 | 10/2004 | Yamada et al. | |
| 2005/0153830 A1 | 7/2005 | Jensen et al. | |
| 2005/0159300 A1 | 7/2005 | Jensen et al. | |
| 2006/0235171 A1 | 10/2006 | Lee et al. | |
| 2007/0010637 A1 | 1/2007 | Lee et al. | |
| 2007/0055021 A1 | 3/2007 | Chandrashekar et al. | |
| 2007/0060722 A1 | 3/2007 | Jayaratne et al. | |
| 2007/0197374 A1 | 8/2007 | Yang et al. | |
| 2010/0016526 A1 | 1/2010 | Etherton et al. | |
| 2012/0010375 A1 | 1/2012 | Yang et al. | |
| 2013/0172500 A1 | 7/2013 | Morrison et al. | |
| 2014/0057777 A1* | 2/2014 | Buck ................ | C08F 210/16 502/117 |
| 2014/0088271 A1* | 3/2014 | Yang ................. | C08F 10/02 526/60 |
| 2014/0303332 A1 | 10/2014 | Yang et al. | |

(Continued)

FOREIGN PATENT DOCUMENTS

| | | |
|---|---|---|
| CN | 1697843 | 11/2005 |
| CN | 1255444 | 5/2006 |

(Continued)

OTHER PUBLICATIONS

International Search Report (English and Korean versions) dated Oct. 21, 2016 in corresponding PCT/KR2016/002842 filed Mar. 22, 2016, 8 pages.
Machine Translation of JP2007-197722, 29 pages.
European Search Report dated Oct. 11, 2019 in corresponding European Patent Application No. 16893664.9, 8 pages.
Office Action dated Dec. 2, 2020 in corresponding Chinese Patent Application No. 201680085502.6, 12 pages.
Machine Translation of JP2007197722, 25 pages.
Office Action dated Jun. 24, 2020 in co-pending U.S. Appl. No. 16/096,809, filed Dec. 17, 2018, 5 pages.
Office Action dated Sep. 11, 2020 in co-pending U.S. Appl. No. 16/096,809, filed Dec. 17, 2018, 12 pages.
Machine Translation of KR20140067410, 20 pages.
Machine Translation of KR20100028317, 15 pages.

(Continued)

*Primary Examiner* — Karuna P Reddy
(74) *Attorney, Agent, or Firm* — Hovey Williams LLP

(57) ABSTRACT

Provided is a hybrid catalyst composition including a first transition metal compound represented by Formula 1 and a second transition metal compound represented by Formula 2, the compounds being different from each other in the Formulae. The hybrid catalyst composition including the first and second transition metal compounds may exhibit high catalytic activity and may prepare a polyolefin having processability and mechanical properties.

14 Claims, 2 Drawing Sheets

(56) References Cited

U.S. PATENT DOCUMENTS

| | | |
|---|---|---|
| 2015/0119539 A1 | 4/2015 | McCullough |
| 2015/0126692 A1 | 5/2015 | Sukhadia et al. |
| 2016/0297902 A1 | 10/2016 | Lee et al. |
| 2018/0134828 A1 | 5/2018 | Doufas et al. |
| 2018/0223009 A1 | 8/2018 | Kim et al. |
| 2019/0023816 A1 | 1/2019 | Cho et al. |
| 2019/0135961 A1 | 5/2019 | Joung et al. |
| 2019/0169323 A1 | 6/2019 | Lee et al. |
| 2019/0169325 A1 | 6/2019 | Lee et al. |
| 2019/0263942 A1 | 8/2019 | Jeong et al. |

FOREIGN PATENT DOCUMENTS

| | | | |
|---|---|---|---|
| CN | 108431053 | 8/2018 | |
| EP | 1 300 425 | 4/2003 | |
| EP | 1300425 A2 * | 4/2003 | ............ C08F 210/16 |
| EP | 1 517 928 | 3/2005 | |
| EP | 2 374 822 | 10/2011 | |
| EP | 2 927 245 | 10/2015 | |
| EP | 3 241 854 | 11/2017 | |
| EP | 3 339 336 | 6/2018 | |
| EP | 3 398 976 | 11/2018 | |
| EP | 3 428 201 | 1/2019 | |
| EP | 3 450 469 | 3/2019 | |
| JP | 2007-177168 | 7/2007 | |
| JP | 2007-197722 | 8/2007 | |
| JP | 2007197722 | 8/2007 | |
| JP | 2009-507105 | 2/2009 | |
| JP | 2011-117006 | 6/2011 | |
| JP | 2014-210937 | 11/2014 | |
| JP | 2015-501855 | 1/2015 | |
| KR | 10-0221164 | 9/1999 | |
| KR | 10-2004-0076965 | 9/2004 | |
| KR | 10-2004-0085650 | 10/2004 | |
| KR | 10-2004-0093465 | 11/2004 | |
| KR | 10-2005-0062617 | 6/2005 | |
| KR | 10-2007-0006466 | 1/2007 | |
| KR | 10-2008-0057279 | 6/2008 | |
| KR | 10-2008-0104331 | 12/2008 | |
| KR | 10-2010-0028317 | 3/2010 | |
| KR | 10-2012-0038798 | 4/2012 | |
| KR | 10-2014-0041162 | 4/2014 | |
| KR | 10-2014-0067410 | 6/2014 | |
| KR | 10-2014-0071142 | 6/2014 | |
| KR | 10-2014-0121766 | 10/2014 | |
| WO | 2004/076502 | 9/2004 | |
| WO | 2004/087770 | 10/2004 | |
| WO | 2015/123165 | 8/2015 | |
| WO | 2016/036204 | 3/2016 | |

OTHER PUBLICATIONS

Office Action dated May 22, 2020 in co-pending U.S. Appl. No. 16/096,795, filed Dec. 13, 2018, 14 pages.
Machine Translation of JP2007177168, 39 pages.
Machine Translation of KR2014-0041162, 24 pages.
Office Action dated Jul. 24, 2020 in co-pending U.S. Appl. No. 16/306,239, filed Dec. 11, 2018, 11 pages.
Office Action dated Jul. 24, 2020 in co-pending U.S. Appl. No. 16/321,114, filed Jan. 28, 2019, 11 pages.
Office Action dated Aug. 3, 2021 in corresponding Chinese Patent Application No. 201680085502.6, 11 pages.
Olifin Polymerization, ISBN 978-7-5628-3450-2, Sep. 30, 2014, press@ecust.edu.cn, 6 pages.

* cited by examiner

[FIG. 1]
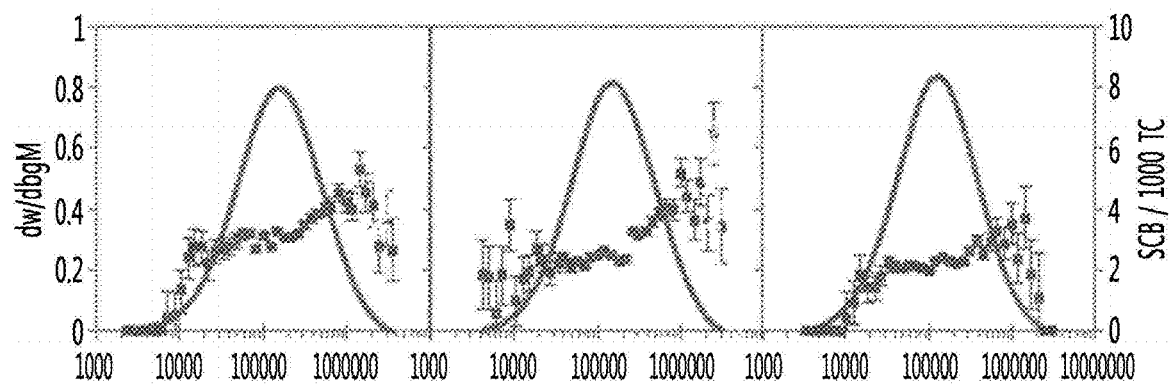
[FIG. 2]
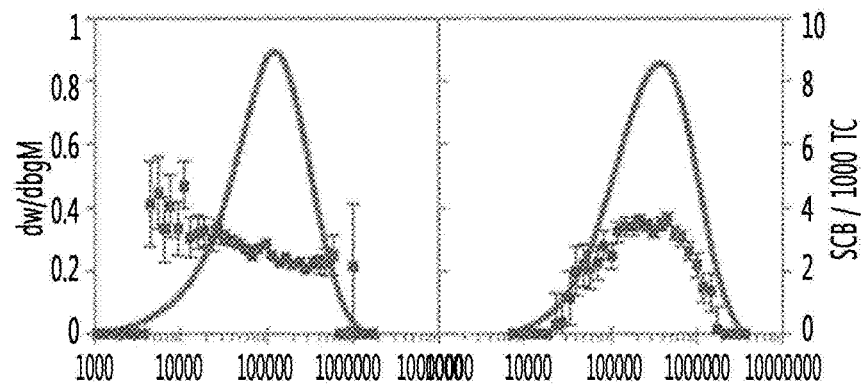

[FIG. 3]
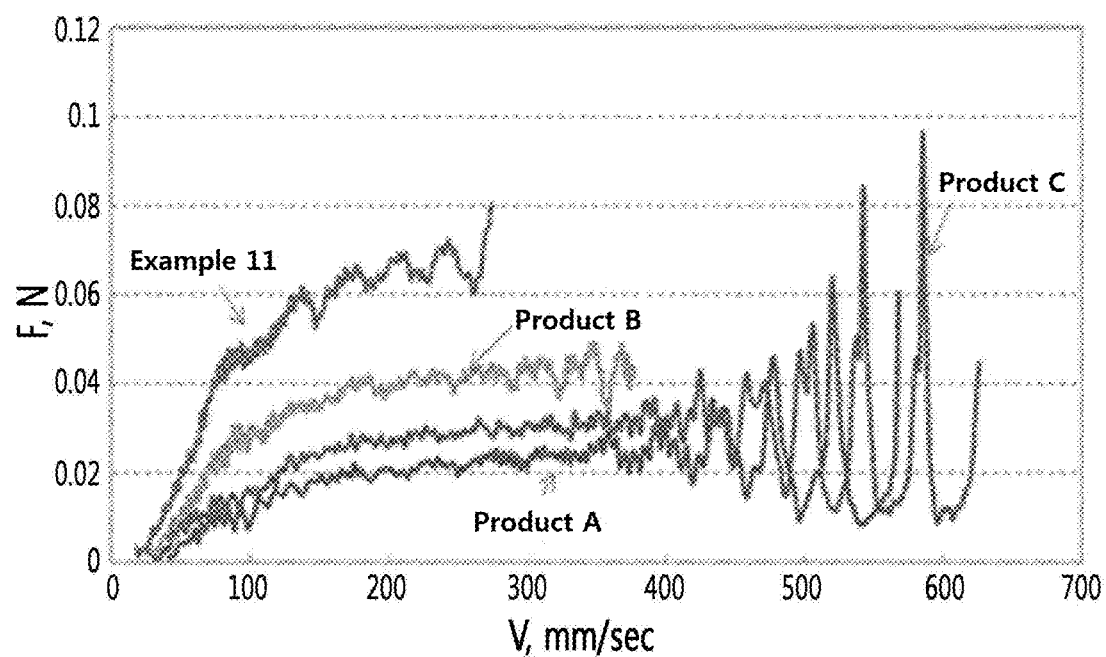

HYBRID CATALYST COMPOSITION, PREPARATION METHOD THEREFOR, AND POLYOLEFIN PREPARED USING SAME

RELATED APPLICATIONS

This application claims priority to PCT International Patent Application No. PCT/KR2016/002842, filed Mar. 22, 2016, which claims the priority benefit of Korean Patent Application No. 10-2016-0028278, filed Mar. 9, 2016, both of which are hereby incorporated by reference in their entireties.

TECHNICAL FIELD

The present invention relates to a novel hybrid catalyst composition, a method of preparing the hybrid catalyst composition, and a polyolefin prepared using the hybrid catalyst composition.

BACKGROUND ART

A polyolefin-based polymer has practical use as a material of various objects, such as shopping bags, vinyl greenhouses, fishing nets, cigarette wrappers, ramen noodle packs, yogurt containers, battery cases, car bumpers, interior materials, shoe soles, washing machines, etc. Known polyolefin-based polymers and copolymers thereof, such as polyethylene, polypropylene, and ethylene-alpha-olefin copolymers, were prepared by a heterogeneous catalyst consisting of titanium and alkylaluminum compounds. Recently, since the development of metallocene catalysts, which are homogeneous catalysts with an extremely high catalytic activity, a method of preparing a polyolefin using a metallocene catalyst has been studied.

Metallocene catalysts are compounds in which cyclopentadienyl ligands are coordinated centering around a transition metal (or a transition metal halide) in a sandwich structure, and have various molecular structures depending on the type of the ligand and the kind of the central metal. In general, metallocene catalysts by themselves are not active for polymerization, and are thus used together with a co-catalyst such as methylaluminoxane, etc. A metallocene catalyst is activated into a cation by action of the co-catalyst, and the co-catalyst is an anion which does not coordinate to the metallocene catalyst which is able to stabilize the unsaturated cationic active species to form a catalyst system having activities for various kinds of olefin polymerization.

Although metallocene catalysts had already been reported in the 1950s, research thereon was not actively conducted due to their low activity. Research on metallocene catalysts was accelerated after Professor Kaminsky of Germany first reported in 1976 that they exhibit a high activity through use of methylaluminoxane as a co-catalyst. Since metallocene catalysts have uniform active sites, there are advantages that the molecular weight distribution of a polymer is narrow, co-polymerization is easy, distribution of co-monomers is uniform, and the polymer's stereostructure may be controlled according to the symmetry of the catalyst.

However, metallocene catalysts have a problem in that a prepared polymer has excellent mechanical strength but low processability because the polymer has a narrow molecular weight distribution due to uniform active sites of the metallocene catalyst. In order to solve this problem, various methods have been proposed, such as modifying the molecular structure of the polymer or broadening the molecular weight distribution thereof. In U.S. Pat. No. 5,272,236, processability of a polymer is improved using a catalyst capable of introducing LCB (long chain branch) as side chains to a main chain of the polymer, but there is a problem in that a supported catalyst has low activity. U.S. Pat. No. 5,914,289 discloses a method of controlling a high molecular weight and a molecular weight distribution by supporting metallocene catalysts which are different from each other. However, since the metallocene catalysts are separately supported, a long preparation time and a large amount of solvent are required, and thus production efficiency is lowered.

In order to solve the problems caused by using metallocene catalysts as a single catalyst and to more simply develop a catalyst showing excellent activity and improved processability, methods of hybrid-supporting metallocene catalysts having different characteristics (heterogeneous metallocene catalysts) have been suggested. U.S. Pat. Nos. 4,935,474, 6,828,394, and 6,894,128, Korean Patent No. 10-1437509, and U.S. Pat. No. 6,841,631 disclose methods of preparing a polyolefin having a bimodal molecular weight distribution, each using catalysts with different reactivities for co-monomers. Although the polyolefin having the bimodal molecular weight distribution prepared in such a manner has improved processability, its kneading property becomes low due to different molecular weight distributions. Therefore, there are still problems in that it is difficult to obtain a product having uniform physical properties after processing and mechanical strength is reduced.

Further, methods of using a bi-nuclear metallocene catalyst having two active sites have been suggested in order to solve the problems of hybrid-supported catalysts using two or more kinds of metallocenes. Korean Patent No. 2003-0012308 discloses a method of controlling a molecular weight distribution and a molecular weight by using the bi-nuclear metallocene catalyst supported on a carrier, but this method has a problem of low activity.

As such, a variety of methods have been suggested in order to solve the problems of metallocene catalysts, but most of the methods are suggested only for linear low-density polyolefins. However, although metallocene catalysts have excellent activity and processability in the preparation of low-density polyolefins, their catalytic activity tends to decrease with a decreasing concentration of co-monomers. Thus, when a high-density polyolefin is prepared using the catalyst used in the preparation of low-density polyolefins, the catalyst shows low activity, which is uneconomical.

Particularly, the activity is an important factor in a gas-phase process. When a high-density polyolefin is prepared by the gas-phase process, a large amount of fine particles is generated in a gas-phase reactor because of the low activity of the metallocene catalyst. Thus, there is a problem in that stable operation is difficult. That is, due to the low activity of the metallocene catalyst, a large amount of fine particles is generated in the gas-phase reactor, which causes generation of a great amount of static electricity. As a result, the fine particles stick to the wall surface of the reactor to interfere with heat transfer, thereby lowering the temperature during a polymerization reaction. Further, as the reaction progresses, the fine particles which stick to the wall surface of the gas-phase reactor continue to grow, making stable operation difficult.

There is a continuous demand for a catalyst to solve the above problems and to produce high-density polyolefins having excellent mechanical strength and processability and high activity, and improvement thereof is required.

DISCLOSURE

Technical Problem

An object of the present invention is to provide a novel hybrid catalyst composition and a preparation method thereof.

Further, the present invention provides a novel hybrid catalyst composition having excellent polymerization activity and capable of controlling a molecular weight and a molecular weight distribution.

Further, another object of the present invention is to provide a high-density polyolefin having excellent mechanical strength and processability and high activity using the hybrid catalyst composition.

Technical Solution

According to characteristics of the present invention to achieve the above-described objects, the present invention includes a first transition metal compound represented by the following Formula 1 and a second transition metal compound represented by the following Formula 2:

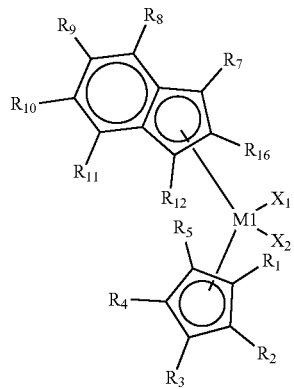

[Formula 1]

In Formula 1, M1 is a Group 4 transition metal of the periodic table of elements, $X_1$ and $X_2$ are the same as or different from each other, and each independently a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkylaryl group having 7 to 40 carbon atoms, an arylalkyl group having 7 to 40 carbon atoms, an alkylamido group having 1 to 20 carbon atoms, an arylamido group having 6 to 20 carbon atoms, or an alkylidene group having 1 to 20 carbon atoms, and $R_1$ to $R_{12}$ are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring.

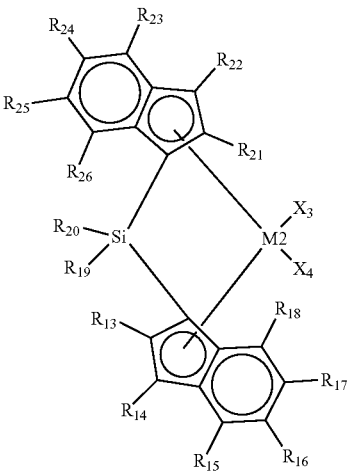

[Formula 2]

In Formula 2, M2 is a Group 4 transition metal of the periodic table of elements, $X_3$ and $X_4$ are the same as or different from each other, and each independently a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkylaryl group having 7 to 40 carbon atoms, an arylalkyl group having 7 to 40 carbon atoms, an alkylamido group having 1 to 20 carbon atoms, an arylamido group having 6 to 20 carbon atoms, or an alkylidene group having 1 to 20 carbon atoms, $R_{13}$ to $R_{18}$ are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring, $R_{19}$ and $R_{20}$ are the same as or different from each other, and each independently a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring, and $R_{21}$ to $R_{26}$ are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring.

The first transition metal compound may have a structure in which ligands are asymmetrically connected to one side and another side of the transition metal (M1), and the second transition metal compound may have a structure in which ligands are symmetrically connected to one side and another side of the transition metal (M2). Further, the second transition metal compound may have a structure in which the ligands connected to one side and another side of the transition metal (M2) are connected via Si.

The hybrid catalyst composition may further include a co-catalyst composed of any one or more of the following Formulae 3 to 6:

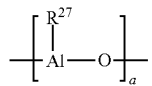

[Formula 3]

In Formula 3, $R^{27}$ is a halogen atom, a hydrocarbon group having 1 to 20 carbon atoms, or a halogen-substituted hydrocarbon group having 1 to 20 carbon atoms, and a is an integer of 2 or more.

$Z(R_{28})_3$          [Formula 4]

In Formula 4, Z is aluminum (Al) or boron (B), $R_{28}$ is a halogen atom, a hydrocarbon group having 1 to 20 carbon atoms, a halogen-substituted hydrocarbon group having 1 to 20 carbon atoms, or an alkoxy group having 1 to 20 carbon atoms.

$[L-H]^+[Z(B)_4]^-$          [Formula 5]

$[L]^+[Z(B)_4]^-$          [Formula 6]

In Formulae 5 and 6, L is a neutral or cationic Lewis acid, Z is a Group 13 element of the periodic table of the elements, and B is a substituted or unsubstituted aryl group having 6 to 20 carbon atoms or a substituted or unsubstituted alkyl group having 1 to 20 carbon atoms. Further, the hybrid catalyst composition may further include a carrier on which the first and second transition metal compounds and the co-catalyst are supported. A weight ratio of the total weight of the transition metals (M1, M2) in the first and second transition metal compounds to the carrier may be 1:1 to 1:1000, and preferably 1:100 to 1:500. In this regard, the carrier may have an average particle size of 10 μm to 250 μm, a fine pore volume of 0.1 cc/g to 10 cc/g, and a specific surface area of 1 m²/g to 1000 m²/g. The hybrid catalyst composition may be used in the preparation of an ethylene-alpha-olefin copolymer.

According to another aspect of the present invention, the present invention provides a method of preparing a polyolefin using monomers in the presence of the above-described hybrid catalyst composition, in which the polyolefin has a density of 0.910 g/cm³ to 0.960 g/cm³, a molecular weight distribution ($M_w/M_n$) of 3 to 10, a melt index ($I_2$) under 2.16 kg of 0.2 to 100, and a melt flow rate (MFR: $I_{21}/I_2$) of 25 or more. The polyolefin may include an ethylene-alpha-olefin copolymer having an HMI (High Molecular Index) of 3.5 or more to 10 or less. Further, the polyolefin may have a melt tension at 190° C. of 0.06 F,N or more.

Advantageous Effects

As described above, according to the present invention, provided is a novel hybrid catalyst composition and a preparation method thereof.

Further, according to the present invention, provided is a novel hybrid catalyst composition having excellent activity during preparation of a polymer and capable of controlling a molecular weight and a molecular weight distribution of the polymer.

Further, according to the present invention, provided is a high-density polyolefin having excellent mechanical strength and processability by using the hybrid catalyst composition.

DESCRIPTION OF DRAWINGS

FIG. 1 is a graph of GPC-IR analysis to examine co-monomer distributions of copolymers prepared in Examples 13, 14, and 15;

FIG. 2 is a graph of GPC-IR analysis to examine co-monomer distributions of copolymers prepared in Comparative Examples 5 and 8; and FIG. 3 is a graph of melt tension analysis of Example 11 and commercial products.

BEST MODE

Hereinafter, a hybrid catalyst composition and a preparation method thereof, and a polyolefin prepared using the hybrid catalyst composition and a preparation method thereof according to specific embodiments of the present invention will be described.

In one aspect of the present invention, the hybrid catalyst composition may include a first transition metal compound represented by the following Formula 1 and a second transition metal compound represented by the following Formula 2:

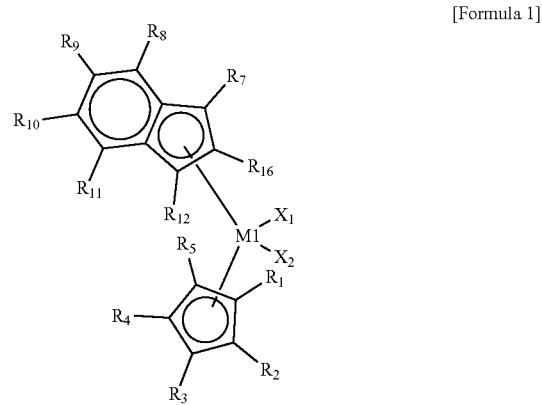

[Formula 1]

In Formula 1, M1 is a Group 4 transition metal of the periodic table of elements, for example, any one of hafnium (Hf), zirconium (Zr), and titanium (Ti). $X_1$ and $X_2$ are the same as or different from each other, and each independently a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkylaryl group having 7 to 40 carbon atoms, an arylalkyl group having 7 to 40 carbon atoms, an alkylamido group having 1 to 20 carbon atoms, an arylamido group having 6 to 20 carbon atoms, or an alkylidene group having 1 to 20 carbon atoms, and $R_1$ to $R_{12}$ are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring. For example, the neighboring two groups of $R_6$ and $R_7$, $R_6$ and $R_{12}$, $R_8$ and $R_9$, $R_9$ and $R_{10}$, or $R_{10}$ and $R_{11}$ may be connected to each other to form an aliphatic ring or an aromatic ring.

In the present invention, the "substitution" may refer to a replacement of a hydrogen atom with a substituent, such as a halogen atom, a hydrocarbon group having 1 to 20 carbon atoms, an alkoxy group having 1 to 20 carbon atoms, an aryloxy group having 6 to 20 carbon atoms, etc., unless otherwise specified. Further, the "hydrocarbon group" refers to a linear, branched, or cyclic saturated or unsaturated hydrocarbon group, unless otherwise specified. The alkyl group, alkenyl group, and alkynyl group may be in a linear, branched, or cyclic form.

The first transition metal compound may have an asymmetric structure in which different ligands are connected to one side and another side of the transition metal (M1), and at the same time, a non-bridged structure in which the ligands on one side and another side are not connected to each other. The asymmetric structure and the non-bridged structure may reduce incorporation of co-monomers by forming a steric hindrance to make the co-monomers less accessible to a catalytic active site of the first transition metal compound.

In one embodiment of the present invention, the first transition metal compound represented by Formula 1 may be any one or more of the following structural formulae:

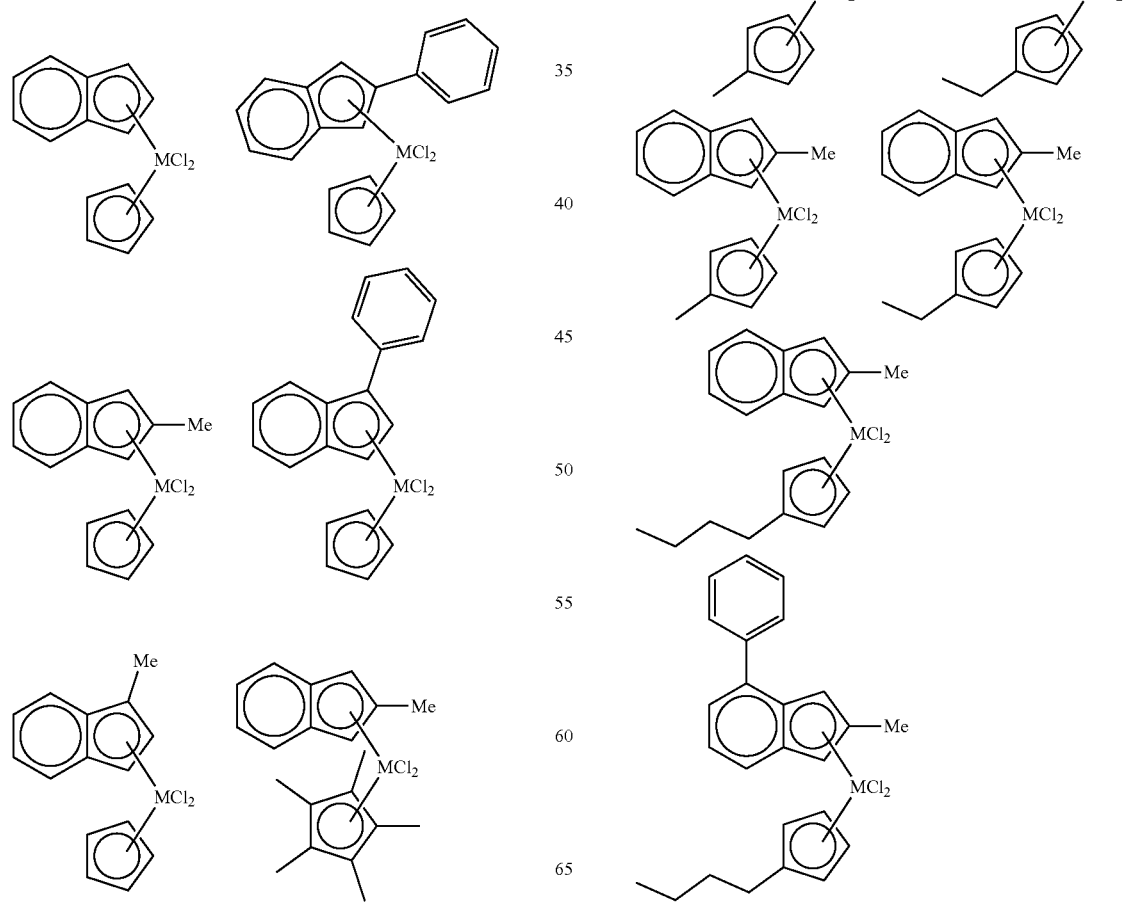

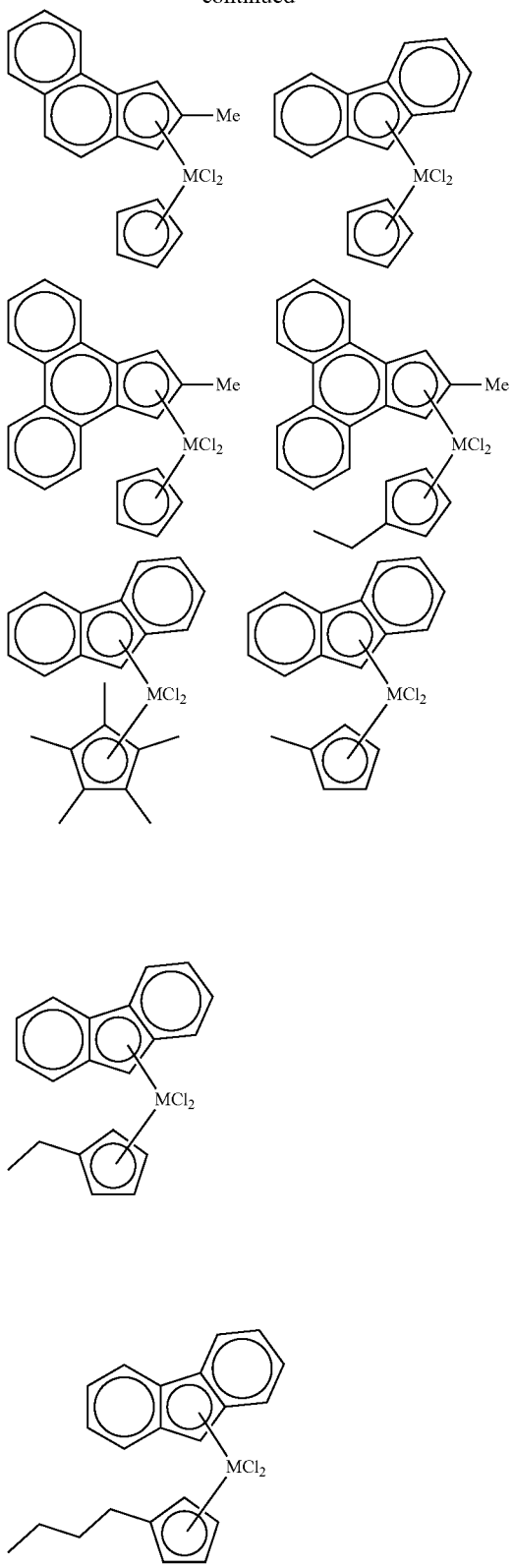

wherein M is any one of hafnium (Hf), zirconium (Zr), and titanium (Ti), and Me is methyl.

The second transition metal compound may be represented by the following Formula 2:

[Formula 2]

In Formula 2, M2 is a Group 4 transition metal of the periodic table of the elements, X3 and X4 are the same as or different from each other, and each independently a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkylaryl group having 7 to 40 carbon atoms, an arylalkyl group having 7 to 40 carbon atoms, an alkylamido group having 1 to 20 carbon atoms, an arylamido group having 6 to 20 carbon atoms, or an alkylidene group having 1 to 20 carbon atoms, R13 to R18 are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring, R19 and R20 are the same as or different from each other, and each independently a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring, and R21 to R26 are the same as or different from each other, and each independently a hydrogen atom, a substituted or unsubstituted alkyl group having 1 to 20 carbon atoms, a substituted or unsubstituted alkenyl group having 2 to 20 carbon atoms, a substituted or unsubstituted aryl group having 6 to 20 carbon atoms, a substituted or unsubstituted alkylaryl group having 7 to 40 carbon atoms, a substituted or unsubstituted arylalkyl group having 7 to 40 carbon atoms, or a substituted or unsubstituted silyl having 1 to 20 carbon atoms, or they may be connected to each other to form a ring. For example, the neighboring two groups of R15 and R16, R16 and R17, R17 and R18, R23 and R24, R24 and R25, or R25 and R26 may be connected to each other to form an aliphatic ring or an aromatic ring.

In the present invention, the "substitution" may refer to a replacement of a hydrogen atom with a substituent, such as a halogen atom, a hydrocarbon group having 1 to 20 carbon atoms, an alkoxy group having 1 to 20 carbon atoms, an aryloxy group having 6 to 20 carbon atoms, etc., unless otherwise specified. Further, the "hydrocarbon group" refers to a linear, branched, or cyclic hydrocarbon group, unless otherwise specified, and also refers to a saturated or unsaturated hydrocarbon group. For example, the alkyl group, alkenyl group, and alkynyl group may be in a linear, branched, or cyclic form.

The second transition metal compound may have a symmetric structure in which ligands are connected to one side and another side of the transition metal (M2), and at the same time, a bridged structure in which the ligands connected to one side and another side are connected to each other. The asymmetric structure and the non-bridged structure may increase incorporation of co-monomers into the second transition metal compound by forming a steric hindrance to make the co-monomers accessible to a catalytic active site of the second transition metal compound.

For example, the second transition metal compound represented by Formula 2 may be any one of the following structural formulae:

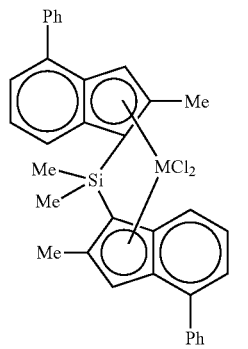
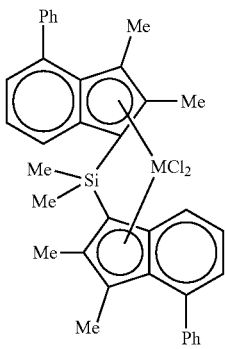
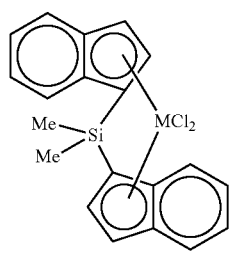
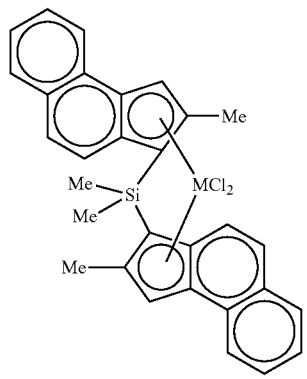
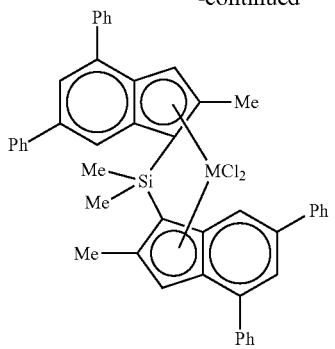
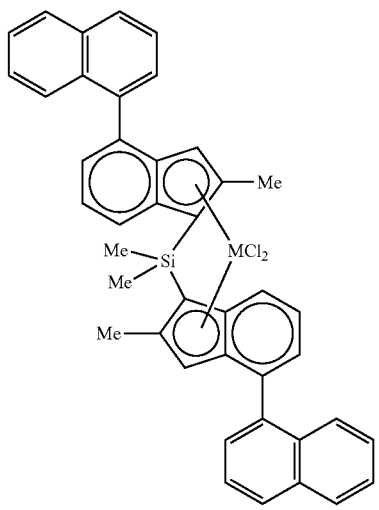
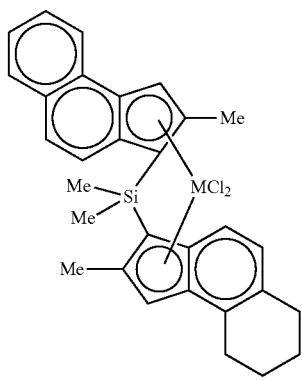
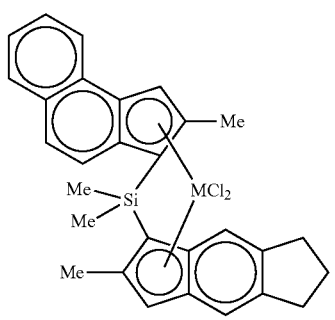

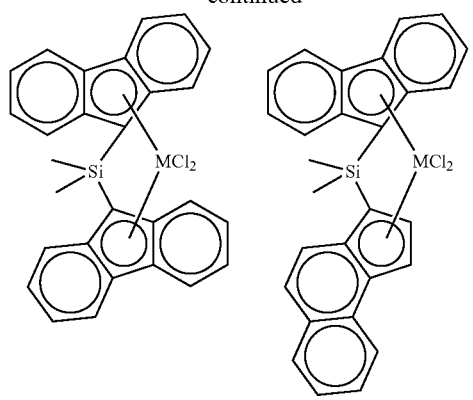
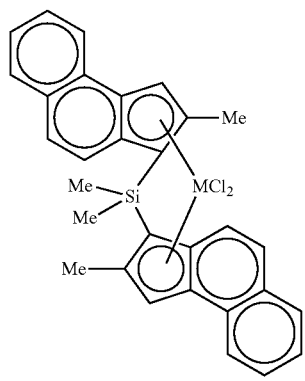
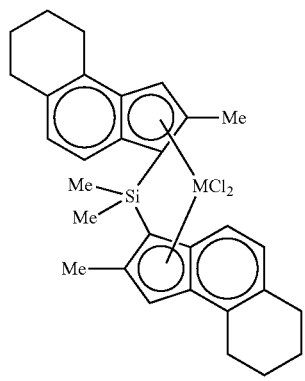
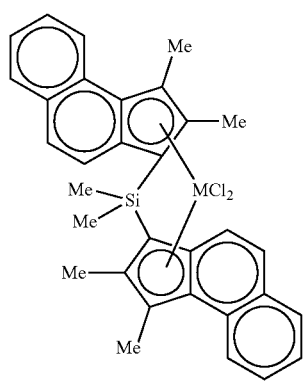
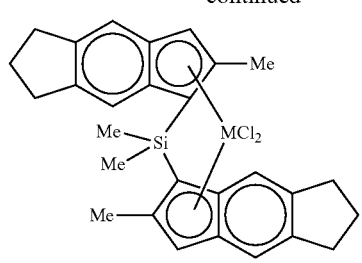
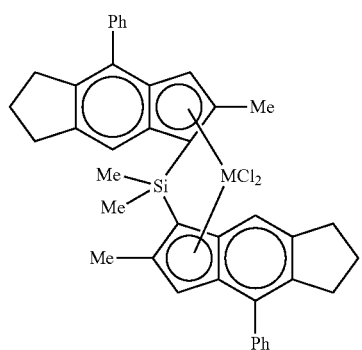
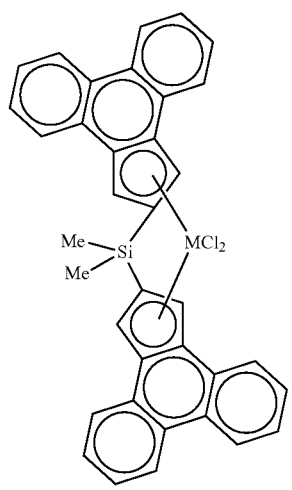
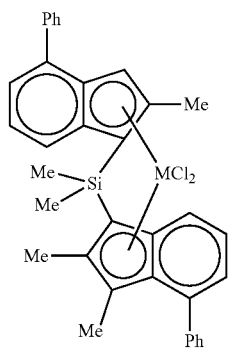
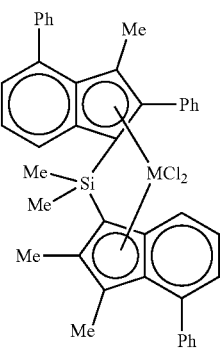

-continued
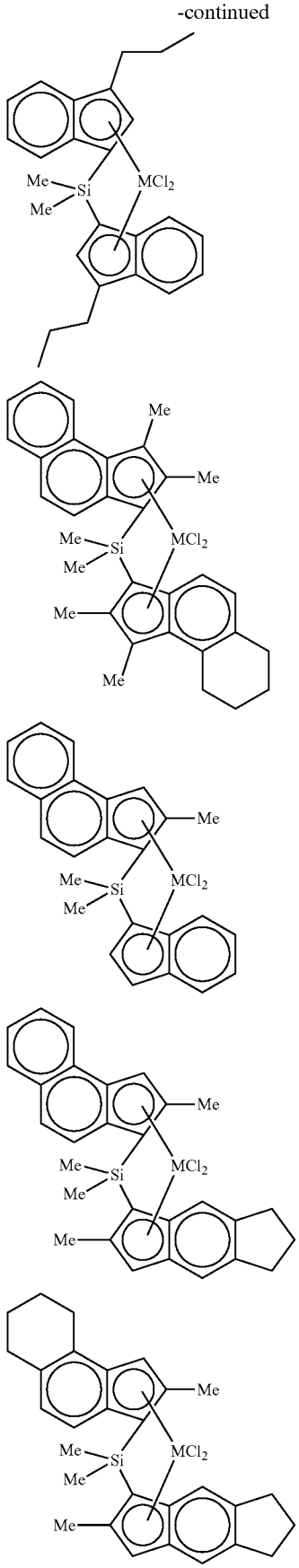
-continued
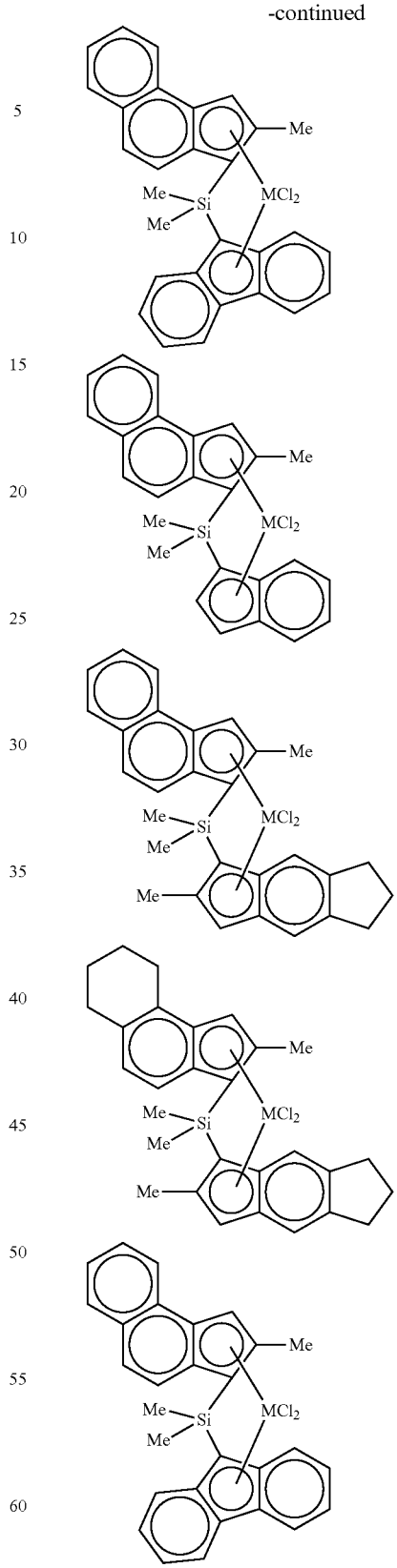
wherein M is any one of hafnium (Hf), zirconium (Zr), and titanium (Ti), Me is a methyl group, and Ph is a phenyl group.

As described above, the hybrid catalyst composition according to embodiments of the present invention may include the first and second transition metal compounds, wherein the first transition metal compound (see Formula 1) may have the non-bridged structure and the asymmetric structure, and the second transition metal compound (see Formula 2) may have the bridged structure connected via Si and the symmetric structure.

When a polymer is synthesized using a monomer together with a co-monomer, the monomer may be, for example, ethylene ($CH_2=CH_2$), and the co-monomer may be any one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene. The monomer may have a short-chain linear structure and a small size. The co-monomer may have a branch or a chain structure longer than the monomer, and may have a three-dimensionally larger size than the monomer. Preferably, the monomer may be easily incorporated into the first transition metal compound, and the co-monomer may be easily incorporated into the second transition metal compound.

In the first transition metal compound, the ligands connected to one side and another side may have the non-bridged structure, and thus the respective ligands may not be fixed to each other. Therefore, the position of each ligand is continuously changed so that the space between the transition metal and the ligand is not constant but fluidly changed. Further, the first transition metal compound may have the asymmetric structure, in which the bond length between the transition metal and the ligands is not constant but changed, because an electron donation phenomenon of donating electrons from each ligand to the transition metal (central metal) differs.

As described above, in the first transition metal compound, the changing position of the ligands on one side and another side and the change in the bond length between the central metal and the ligands may not stay constant but change the path toward the active site of the first transition metal compound. Since the monomer has a short-chain linear structure, there is little steric hindrance in the path toward the active site of the first transition metal compound and it easily approaches the active site. In contrast, the co-monomer is highly sterically hindered and thus does not easily approach the active site.

In the second transition metal compound, the ligands on one side and another side are fixed by a bridged structure via Si to form a constant space between the transition metal and the ligand. Further, the second transition metal compound may have a symmetric structure, and the bond length between the transition metal and the ligands provided on one side and another side may not change but stay constant. In the second transition metal compound, the positions of the ligands fixed on one side and another side and the bond length between the central metal and the ligands are constant, thereby constantly maintaining the path toward the active site of the second transition metal compound. Due to the constant space provided by the second transition metal compound, approach of the co-monomer to the active site of the second transition metal compound is relatively easy, as compared with approach of the co-monomer to the active site of the first transition metal compound.

In other words, the first transition metal compound has a structure to which the monomer is more accessible, and the second transition metal compound has a structure to which the co-monomer is more accessible. Preferably, the first transition metal compound may have high monomer incorporation and the second transition metal compound may have high co-monomer incorporation. The first transition metal compound has low co-monomer incorporation to form a low-molecular-weight body, thereby improving processability of the polymer, and may also exhibit high activity during preparation of a high-density polymer.

In the second transition metal compound, Si that connects the ligands on one side and another side may protect the catalyst active site of the second transition metal compound to provide a stabilized catalyst active site, as compared with the first transition metal compound. Therefore, the second transition metal compound may form a high-molecular-weight body by the stabilized catalyst active site. Since the second transition metal compound may have high co-monomer incorporation, a polymer synthesized thereby may have high mechanical properties. Specifically, the second transition metal compound may form a high-molecular-weight body due to the high co-monomer incorporation and may concentrate co-monomer distribution in the high-molecular-weight body. As such, a polymer having a uniform distribution by concentration of co-monomers in the high-molecular-weight body may form a large amount of tie molecules, thereby improving impact strength, flexural strength, environmental stress cracking resistance, and melt tension. In contrast, when a catalyst composed of only the second transition metal compound is used to prepare a polyolefin, there are problems in that the catalytic active site for monomers is too low, which is uneconomical, and a high-molecular-weight body is excessively formed to reduce processability.

For example, since the hybrid catalyst composition according to the present invention is provided with the first transition metal compound and the second transition metal compound which are different from each other in the structure, it may exhibit excellent activity during polymer preparation, and may easily control a molecular weight and a molecular weight distribution of the prepared polymer. Further, the hybrid catalyst composition may separately control monomer and co-monomer synthesis by the first and second transition metal compounds, and as a result, the prepared polyolefin may have excellent mechanical properties and processability at the same time.

For example, the hybrid catalyst composition according to the present invention may be prepared by hybrid-supporting the second transition metal compound having high reactivity with the co-monomer and the first transition metal compound having low reactivity with the co-monomer.

The hybrid catalyst composition according to the present invention may further include a co-catalyst composed of any one or more selected from the following Formulae 3 to 6, together with the first and second transition metal compounds:

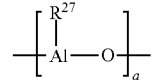

[Formula 3]

In Formula 3, $R^{27}$ is a halogen atom, a hydrocarbon group having 1 to 20 carbon atoms, or a halogen-substituted hydrocarbon group having 1 to 20 carbon atoms, and a is an integer of 2 or more. For example, the compound represented by Formula 3 may include any one or more selected from methylaluminoxane, ethylaluminoxane, isobutylaluminoxane, and butylaluminoxane.

$$Z(R_{28})_3 \quad \text{[Formula 4]}$$

In Formula 4, Z is aluminum (Al) or boron (B), $R_{28}$ is a halogen atom, a hydrocarbon group having 1 to 20 carbon atoms, a halogen-substituted hydrocarbon group having 1 to 20 carbon atoms, or an alkoxy group having 1 to 20 carbon atoms. For example, the compound represented by Formula 4 may include any one or more selected from trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron.

$$[L-H]^+[Z(B)_4]^- \qquad \text{[Formula 5]}$$

$$[L]^+[Z(B)_4]^- \qquad \text{[Formula 6]}$$

In Formulae 5 and 6, L is a neutral or cationic Lewis acid, Z is a Group 13 element of the periodic table of elements, for example, any one or more of boron (B), aluminum (Al), gallium (Ga), and indium (In), and B is a substituted or unsubstituted aryl group having 6 to 20 carbon atoms or a substituted or unsubstituted alkyl group having 1 to 20 carbon atoms.

For example, the compound represented by Formula 5 or Formula 6 may include any one or more of methyldioctadecylammonium tetrakis(pentafluorophenyl)borate ([HNMe$(C_{18}H_{37})_2]^+[B(C_6F_5)_4]^-$), trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetrakis(phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbonium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl)aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate.

In one embodiment of the present invention, the hybrid catalyst composition may further include a carrier, wherein the carrier may support the co-catalyst together with the first and second transition metal compounds. For example, the carrier may include any one or more of silica, alumina, titanium dioxide, zeolite, zinc oxide, starch, and synthetic polymers.

In the hybrid catalyst composition, a weight ratio of the first transition metal compound to the second transition metal compound is preferably 1:100 to 100:1. Further, a weight ratio of the total weight of the transition metals (M1, M2) in the first and second transition metal compounds to the carrier may be 1:1 to 1:1000. Preferably, weight ratio of the total weight of the transition metals (M1, M2) in the first and second transition metal compounds to the carrier may be 1:100 to 1:500. When the weight ratio of the total weight of the transition metals in the first and second transition metal compounds to the carrier is lower than the above range, part of the first and second transition metal compounds may not be supported on the carrier, and when the content of the carrier is too high, a portion of the carrier that supports the first and second transition metal compounds is increased, and thus the catalytic activity per unit volume is problematically lowered. When the carrier and the transition metals included in the first and second transition metal compounds are included within the above-described range, the hybrid catalyst composition may exhibit proper supported catalyst activity, and therefore, it is advantageous in maintaining the catalytic activity and an economical aspect.

A weight ratio of the carrier to the co-catalyst of Formula 3 or Formula 4 may be 1:100 to 100:1, and a weight ratio of the carrier to the co-catalyst of Formula 5 or Formula 6 may be 1:20 to 20:1. When the co-catalyst and the first and second transition metal compounds are included at the above weight ratio, it is advantageous in maintaining the catalytic activity and an economical aspect.

In the hybrid catalyst composition according to the present invention, the carrier may be a porous material having a large surface area. The carrier may have an average particle size of 10 μm to 250 μm, preferably an average particle size of 10 μm to 150 μm, and more preferably an average particle size of 20 μm to 100 μm. The carrier may have a fine pore volume of 0.1 cc/g to 10 cc/g, preferably 0.5 cc/g to 5 cc/g, and more preferably 1.0 cc/g to 3.0 cc/g. The carrier may have a specific surface area of 1 m$^2$/g to 1000 m$^2$/g, preferably 100 m$^2$/g to 800 m$^2$/g, and more preferably 200 m$^2$/g to 600 m$^2$/g. For example, the carrier may have an average particle size of 10 μm to 250 μm, a fine pore volume of 0.1 cc/g to 10 cc/g, and a specific surface area of 1 m$^2$/g to 1000 m$^2$/g. The carrier may support the first and second transition metal compounds and the co-catalyst in the pores provided in the carrier, thereby fixing the positions of the first and second transition metal compounds and the co-catalyst and improving catalytic efficiency. When the average particle size of the carrier is less than 10 μm, the size of the carrier is too small, and thus a large amount of loss may occur in a process of modifying the carrier, and when the average particle size of the carrier is more than 250 μm, the first and second transition metal compounds and the co-catalyst are supported only on the surface-side pores of the carrier, not inside the carrier, and thus the portion of the carrier that does not support the first and second transition metal compounds and the co-catalyst is increased, thereby reducing reaction efficiency. Further, the fine pore volume of the carrier is preferably 0.1 cc/g to 10 cc/g. When the fine pore volume is less than 0.1 cc/g, the pore size is too small, and thus it is not suitable for supporting the first and second transition metal compounds and the co-catalyst. When the fine pore volume is 10 cc/g, the pore is too large, as compared with the sizes of the first and second transition metal compounds and the co-catalyst, and thus it is difficult to efficiently fix the positions of the first and second transition metal compounds and the co-catalyst. Further, the specific surface area of the carrier is preferably 1 $m^2/g$ to 1000 $m^2/g$. When the specific surface area is less than 1 $m^2/g$, the specific surface area of the carrier is too small, as compared with the pore size of the carrier, and thus supporting efficiency may be reduced. When the specific surface area of the carrier is more than 1000 $m^2/g$, the efficiency of supporting the first and second transition metal compounds and the co-catalyst in the carrier may be problematically reduced.

In another embodiment of the present invention, the hybrid catalyst composition may be prepared by a method of preparing the hybrid catalyst composition, the method including the steps of activating the first and second transition metal compounds, and supporting the activated first and second transition metal compounds in the carrier. In this regard, the hybrid catalyst composition may further include the co-catalyst, and the co-catalyst may be first supported in the carrier, before supporting the first and second transition metal compounds. Further, the method of preparing the hybrid catalyst composition may further include the step of activating the first and second transition metal compounds. The first and second transition metal compounds may be separately activated and then mixed with each other, or they may be mixed with each other and then activated. Further, after the first and second transition metal compounds are mixed with the co-catalyst, the mixture may be activated and then supported in the carrier, or after the co-catalyst is first supported in the carrier, the first and second transition metal compounds may be supported thereto.

Preferably, the hybrid catalyst composition according to embodiments of the present invention may be prepared by the steps of preparing the first transition metal compound and the second transition metal compound, mixing the first and second transition metal compounds with the co-catalyst to prepare a mixture, introducing the carrier into a solvent in a reactor, followed by stirring, and then introducing the mixture of the first and second transition metal compounds and the co-catalyst to the solvent provided with the carrier.

The first and second transition metal compounds may be activated by mixing (or contacting) with the co-catalyst. The mixing may be commonly carried out under an atmosphere of inert gas, such as nitrogen or argon, in the absence of a solvent or in the presence of a hydrocarbon solvent. For example, an activation temperature of the first and second transition metal compounds may be 0° C. to 100° C., and preferably 10° C. to 30° C. The hydrocarbon solvent may be a common organic solvent, including an aliphatic hydrocarbon solvent such as hexane or pentane, an aromatic hydrocarbon solvent such as toluene or benzene, a chlorinated hydrocarbon solvent such as dichloromethane, an ether-based solvent such as diethyl ether or tetrahydrofuran, acetone, ethyl acetate, etc. Preferably, the solvent may be toluene or hexane. Further, when the hybrid catalyst composition is prepared, a reaction temperature may be 0° C. to 100° C., and preferably 25° C. to 70° C., and a reaction time may be 5 minutes to 24 hours, but is not limited thereto.

After homogeneously dissolving the first and second transition metal compounds in the hydrocarbon solvent, this solution may be used as it is, or in the form of a solid powder after removing the solvent, but is not limited thereto.

When the carrier in the hybrid catalyst composition is silica, it may be used in the form of a solid powder after removing the solvent. In this regard, a drying temperature of the hybrid catalyst composition-supported silica may be 200° C. to 900° C., preferably 300° C. to 800° C., and more preferably 400° C. to 700° C. When the drying temperature of the silica is lower than 200° C., the amount of water which remains in the silica is large, and thus water on the surface of the silica may react with the co-catalyst, and when the temperature is higher than 900° C., the structure of the carrier may be broken. Further, a concentration of hydroxyl groups on dry silica may be 0.1 mmol/g to 5 mmol/g, preferably 0.7 mmol/g to 4 mmol/g, and more preferably 1.0 mmol/g to 2 mmol/g. When the concentration of hydroxyl groups is less than 0.5 mmol/g, a supporting amount of the co-catalyst may be decreased, and when the concentration of hydroxyl groups is more than 5 mmol/g, the first and second transition metal compounds are undesirably inactivated.

The hybrid catalyst composition may be used in olefin polymerization, and a polyolefin polymer prepared using the same may have excellent processability, long-term pressure resistance, impact resistance, melt tension, and environmental stress cracking resistance (ESCR) characteristics, and a high molecular weight and a broad molecular weight distribution.

In still another aspect of the present invention, a method of preparing a polyolefin may be provided, and the method of preparing the polyolefin may employ the hybrid catalyst composition according to one embodiment of the present invention. The polyolefin may be prepared using monomers or co-monomers in the presence of the hybrid catalyst composition, and the prepared polyolefin may have a density of 0.910 $g/cm^3$ to 0.960 $g/cm^3$, a molecular weight distribution ($M_w/M_n$) of 3 to 10, a melt index under 2.16 kg ($I_2$) of 0.2 to 100, and a melt flow rate (MFR: $I_{21}/I_2$) of 25 or more.

The density of the polyolefin is preferably 0.910 $g/cm^3$ to 0.960 $g/cm^3$. When the density of the polyolefin is less than 0.910 $g/cm^3$, crystallinity of the polyolefin is low, and thus its mechanical strength is low. When the density of the polyolefin is more than 0.960 $g/cm^3$, solubility of the polyolefin is reduced, and thus processability is deteriorated. When the molecular weight distribution ($M_w/M_n$) of the polyolefin is less than 3, the polyolefin may have high strength, but there is a problem in that processability of the polyolefin deteriorates too much. When the molecular weight distribution ($M_w/M_n$) of the polyolefin is more than 10, the polyolefin may have good processability, but there is a problem in that physical properties such as mechanical strength, etc. are deteriorated. The melt index under 2.16 kg ($I_2$) of the polyolefin is preferably 0.2 to 100. When the melt index ($I_2$) is less than 0.2, fluidity of the polyolefin is low, which is problematic at the time of preparing the polyolefin. When the melt index ($I_2$) is more than 100, viscosity of the polyolefin is too high, and thus the amount of loss in the reactor is increased, and high temperature and high pressure are required in the reaction, which problematically increases the process cost. The melt flow rate (MFR: $I_{21}/I_2$) of the polyolefin is a measure of flowability of the polyolefin. When the melt flow rate (MFR: $I_{21}/I_2$) of the polyolefin is less than 25, flowability of the polyolefin is problematically too low during injection molding.

The method of preparing the polyolefin may include the step of contacting one or more monomers, e.g., olefin monomers, with the hybrid catalyst composition to prepare a polyolefin homopolymer or a polyolefin copolymer. The method of preparing the polyolefin (polymerization reaction) may be liquid-, slurry-, or gas-phase polymerization. Further, reaction conditions for each polymerization reaction may vary depending on a polymerization method (liquid-phase polymerization, slurry-phase polymerization, or gas-phase polymerization), desired polymerization results or shape of the polymer. When the polymerization reaction is carried out in a liquid or slurry phase, a solvent or an olefin monomer itself may be used as a medium. For example, the solvent may include any one or more of propane, butane, pentane, hexane, octane, decane, dodecane, cyclopentane, methylcyclopentane, cyclohexane, methylcyclohexane, benzene, toluene, xylene, dichloromethane, chloroethane, dichloroethane, and chlorobenzene, and these solvents may be used after being mixed with each other at a predetermined ratio.

In a specific embodiment, the monomer may be exemplified by ethylene, α-olefins, cyclic olefins, dienes, trienes, styrenes, etc. The α-olefins may include aliphatic olefins having 3 to 12 carbon atoms, for example, 3 to 8 carbon atoms, and specifically, the α-olefins may be exemplified by propylene, 1-butene, 1-pentene, 3-methyl-1-butene, 1-hexene, 4-methyl-1-pentene, 3-methyl-1-pentene, 1-heptene, 1-octene, 1-decene, 4,4-dimethyl-1-pentene, 4,4-diethyl-1-hexene, 3,4-dimethyl-1-hexene, etc. The α-olefins may be homopolymerized, or two or more kinds of olefins may be alternating, random, or block copolymerized. The copolymerization of the α-olefins may include copolymerization of ethylene and α-olefin having 3 to 12 carbon atoms, for example, 3 to 8 carbon atoms (specifically, ethylene and propylene, ethylene and 1-butene, ethylene and 1-hexene, ethylene and 4-methyl-1-pentene, ethylene and 1-octene, etc.) and copolymerization of propylene and α-olefin having 4 to 12 carbon atoms, for example, 4 to 8 carbon atoms (specifically, propylene and 1-butene, propylene and 4-methyl-1-pentene, propylene and 4-methyl-1-butene, propylene and 1-hexene, propylene and 1-octene, etc.). In the copolymerization of ethylene or propylene and another α-olefin, the amount of another α-olefin may be 99 mol % or less of a total of the monomers, commonly, 80 mol % or less in the case of an ethylene copolymer.

In the method of preparing the polyolefin according to one embodiment of the present invention, an amount of the hybrid catalyst composition to be used is not particularly limited, but concentrations of the central metals (M1, M2) of the first and second transition metal compounds represented by Formulae 1 and 2 may be, for example, $1 \times 10^{-5}$ mol/L to $9 \times 10^{-5}$ mol/L in a polymerization reaction system. Further, a temperature and a pressure of the polymerization reaction may vary depending on reactants, reaction conditions, etc., and therefore, are not particularly limited. The temperature may be 0° C. to 200° C., preferably 100° C. to 180° C. in the case of liquid-phase polymerization, and 0° C. to 120° C., preferably 60° C. to 100° C. in the case of slurry-phase or gas-phase polymerization. Further, the pressure may be 1 bar to 150 bar, preferably 30 bar to 90 bar, and more preferably 10 bar to 20 bar. The pressure may be generated by injection of olefin monomer gas (e.g., ethylene gas).

Further, the polymerization reaction may be carried out in a batch, semi-continuous, or continuous manner. The batch, semi-continuous, or continuous method may be used individually or in a combination of two or more thereof, for example, the polymerization may be carried out by two or more steps having different reaction conditions. A molecular weight of a final polymer may be controlled by changing the temperature of the polymerization reaction or by injecting hydrogen into a reactor.

The polyolefin according to one embodiment of the present invention may be obtained as an ethylene homopolymer or an ethylene-alpha-olefin copolymer by using the hybrid catalyst composition, and may have a single molecular weight distribution. Further, the hybrid catalyst composition may exhibit excellent catalytic activity, and when a polyolefin polymer is prepared using the hybrid catalyst composition, the polyolefin polymer may have a broad molecular weight distribution, and a polymer in which co-monomers are concentrated in a high-molecular-weight body may be prepared. The polyolefin polymer may have excellent impact strength, flexural strength, stress cracking resistance, and melt tension, thereby being used in blow molding articles, injection molding articles, films, pipes, or extrusion molding articles.

MODE FOR INVENTION

Hereinafter, the constitution and action of the present invention will be described in more detail with reference to exemplary embodiments of the present invention. However, these should not be construed as limiting, but merely as exemplifications of preferred embodiments.

A hybrid catalyst composition according to Examples of the present invention may include first and second transition metal compounds, wherein the first and second transition metal compounds may be prepared by the following methods.

Preparation of First and Second Transition Metal Compounds

Preparation Example 1: Preparation of First Transition Metal Compound [indenyl(cyclopentadienyl)]ZrCl$_2$ Indene (5 g, 0.043 mol) was dissolved in hexane (150 mL), mixed thoroughly, and cooled to −30° C., and then 2.5 M n-butyllithium (n-BuLi) hexane solution (17 mL, 0.043 mol) was slowly added dropwise to the indene hexane solution. Subsequently, the temperature was slowly raised to room temperature, and the mixture was stirred at room temperature for 12 hours. The white suspension produced was filtered using a glass filter to obtain a white solid, which was thoroughly dried to obtain an indene lithium salt (yield: 99%).

CpZrCl$_3$ (2.24 g, 8.53 mmol) was slowly dissolved in ether (30 mL), and then cooled to −30° C. The indene lithium salt (1.05 g, 8.53 mmol) dissolved in ether (15 mL) was slowly added dropwise to the CpZrCl$_3$ dissolved in ether, and stirred overnight to obtain [indenyl(cyclopentadienyl)]ZrCl$_2$ (yield 97%).

Preparation Example 2: Preparation of First Transition Metal Compound [2-methyl benzeindenyl (cyclopentadienyl)]ZrCl$_2$

[2-Methyl benzeindenyl (cyclopentadienyl)]ZrCl$_2$ (yield: 95%) was obtained using 2-methylbenzeindene in the same manner as in Preparation Example 1.

Preparation Example 3: Preparation of First Transition Metal Compound [2-phenyl benzeindenyl (tetramethylcyclopentadienyl)]ZrCl$_2$

[2-Phenyl benzeindenyl (tetramethylcyclopentadienyl)]ZrCl$_2$ (yield: 93%) was obtained using 2-methylbenzeindene and tetramethylcyclopentadiene in the same manner as in Preparation Example 1.

Preparation Example 4: Preparation of First Transition Metal Compound [fluorenyl (cyclopentadienyl)]ZrCl$_2$

[Fluorenyl (cyclopentadienyl)]ZrCl$_2$ (yield: 92%) was obtained using fluorene and cyclopentadiene in the same manner as in Preparation Example 1.

Preparation Example 5: Preparation of Second Transition Metal Compound Me$_2$Si(2-methyl-4,5-benzoindenyl)$_2$ZrCl$_2$

Preparation Example 5-1: Preparation of Ligand Compound

2-Methylbenzeindene (2.13 g, 1 eq) was added to 30 mL of hexane, and then an n-butyllithium (n-BuLi) hexane solution (8.1 mL, 1.1 eq, 1.6 M in hexane) was slowly added thereto at −30° C. Subsequently, after the temperature was slowly raised to room temperature, the mixture was stirred for 12 hours. The solid produced was filtered and washed with hexane, and dried under vacuum to obtain a light gray solid compound.

To this light gray solid compound, 15 mL of a SiMe$_2$Cl$_2$ (520 mg, 1 eq) ether dispersion was slowly added. After the temperature was slowly raised to room temperature, the mixture was stirred for 12 hours. The organic layer was extracted using a mixed solution of ether and water, dried, and then washed with hexane to obtain (2-methylbenzeindenyl)$_2$SiMe$_2$ (yield: 55%).

$^1$H NMR (CDCl$_3$): δ=8.15-7.42 (m, 14H), 4.00 (m, 2H), 2.37 (m, 6H), −0.32 (m, 6H)]

Preparation Example 5-2: Preparation of Second Transition Metal Compound

The compound (0.4 g, 1 eq) obtained in Preparation Example 5-1 was added to 15 mL of THF, and then an n-butyllithium hexane solution (1.32 mL, 2.2 eq, 1.6 M in hexane) was slowly added thereto at −30° C. Subsequently, the temperature was slowly raised to room temperature, and the mixture was stirred for 12 hours to prepare a dilithium salt. To this dilithium salt slurry solution, ZrCl$_4$ (435 mg, 1 eq) was slowly added, followed by stirring for 12 hours. The solvent was removed under vacuum, and a resultant was washed with THF and MC to obtain Me$_2$Si(2-methyl-4,5-benzoindenyl)$_2$ZrCl$_2$ (yield: 37%).

$^1$H NMR (CDCl$_3$): δ=7.97-7.26 (m, 14H), 7.97-7.08 (m, 14H), 2.59 (s, 6H), 2.37 (s, 6H), 1.36 (s, 6H), 1.46 (s, 3H), 1.26 (s, 3H)

Preparation Example 6: Preparation of Second Transition Metal Compound Me$_2$Si{2-methyl-4-(1-naphthyl)}$_2$ZrCl$_2$

Preparation Example 6-1: Preparation of Ligand Compound

2-Methyl-4-bromo indene (2 g, 1 eq), palladium-tetrakis (triphenylphosphine) (Pd(PPh$_3$)$_4$) (553 mg, 0.05 eq), and 1-NaphB(OH)$_2$ (1-naphthalene boronic acid) (2.14 g, 1.3 eq) were added to a THF/MeOH solution (4:1, 40 mL), and a degassed K$_2$CO$_3$ aqueous solution (2.0 M, 3.3 eq) was introduced at room temperature and stirred under reflux at 80° C. for 12 hours to obtain (2-methyl-4-(1-naphthyl) indene). The obtained 2-methyl-4-(1-naphthyl)indene was added to 50 mL of toluene, and an n-butyllithium hexane solution (7.8 mL, 1.1 eq, 1.6 M in hexane) was slowly added at −30° C. The temperature was slowly raised to room temperature, and the mixture was stirred for 12 hours. The solid produced was filtered, washed with hexane, and then dried under vacuum to obtain 2-methyl-4-(1-naphthyl)indenyl lithium.

SiMe$_2$Cl$_2$ (462 mg, 1 eq) was slowly added to 2-methyl-4-(1-naphthyl)indenyl lithium (1.88 g, 2 eq), 13 mL of toluene, and 3 mL of THF at −30° C. The temperature was slowly raised to 55° C., and the mixture was stirred for 12 hours to obtain 1.97 g of dimethyl-bis{2-methyl-4-(1-naphthyl)indenyl}silane (yield: 97%).

$^1$H NMR (CDCl$_3$): δ=7.94-7.16 (m, 20H), 6.25 (m, 2H), 3.90 (m, 2H), 2.24-2.05 (m, 6H), −0.15 (m, 6H)]

Preparation Example 6-2: Preparation of Second Transition Metal Compound

Me$_2$Si{2-methyl-4-(1-naphthyl)}$_2$ZrCl$_2$ (yield 94%) was obtained using dimethyl-bis{2-methyl-4-(1-naphthyl)indenyl}silane in the same manner as in Preparation Example 3-2.

$^1$H NMR (CDCl$_3$): δ=rac-G7: 7.92-7.14 (m, 20H), 7.92-7.00 (m, 20H), 6.13 (s, 2H), 6.51 (s, 2H), 2.34 (s, 6H), 2.24 (s, 6H), 1.55 (s, 3H), 1.25 (s, 3H), 1.38 (s, 6H)

Preparation Example 7: Preparation of Second Transition Metal Compound Me$_2$Si{2-methyl-4-(2-naphthyl)}$_2$ZrCl$_2$

Preparation Example 7-1: Preparation of Ligand Compound

Dimethylbis{2-methyl-4-(2-naphthyl) indenyl}silane (yield: 51%) was obtained using 2-methyl-7-(2-naphthyl) indene in the same manner as in Preparation Example 4-1.

$^1$H NMR (CDCl$_3$): δ=8.00-7.20 (m, 20H), 6.84 (m, 2H), 3.84 (m, 2H), 2.14 (m, 6H), −0.12 (m, 6H)]

Preparation Example 7-2: Preparation of Second Transition Metal Compound

Me$_2$Si{2-methyl-4-(2-naphthyl)}$_2$ZrCl$_2$ (yield: 90%) was obtained using the compound obtained in Preparation Example 7-1 in the same manner as in Preparation Example 4-2.

$^1$H NMR (CDCl$_3$): δ=8.16-6.90 (m, 22H), 2.48 (s, 6H), 2.29 (s, 6H), 1.52 (s, 3H), 1.37 (s, 6H), 1.28 (s, 3H)

Preparation Example 8: Preparation of Second Transition Metal Compound Me$_2$Si (2-methyl-4-phenyl indenyl)$_2$ZrCl$_2$

Preparation Example 8-1: Preparation of Ligand Compound

2-Methyl-4-bromoindene (2 g, 1 eq) (7 g, 1 eq), and dichloro(1,3-bis(diphenylphosphino)propane)nickel (Ni(dppp)Cl$_2$) (363 mg, 0.02 eq) were added to ether (100 mL), and 3.0 M PhMgBr (13.3 g, 1.05 eq, in ether) was added thereto at 0° C. for 1 hour. After the temperature was slowly raised to room temperature, the mixture was stirred under reflux at 50° C. for 12 hours. After reaction was completed, the solution was placed in an ice bath. 1 N HCl was added thereto until pH 4 was reached. The organic layer was extracted using a separatory funnel, and dried over MgSO$_4$ to remove water. The resultant was filtered and the solvent was dried to obtain 2-methyl-4-(phenyl)indene (yield: 97%). Me$_2$Si(2-Methyl-4-phenyl indenyl)$_2$ (yield: 95%) was prepared using 2-methyl-4-(phenyl)indene in the same manner as in Preparation Example 4-1.

$^1$H NMR (CDCl$_3$): δ=7.56-7.14 (m, 16H), 6.80 (m, 2H), 3.80 (s, 2H), 2.25 (s, 3H), 2.17 (s, 3H), 0.18 (m, 6H)]

Preparation Example 8-2: Preparation of Second Transition Metal Compound

Me$_2$Si(2-Methyl-4-phenyl indenyl)$_2$ZrCl$_2$ (yield 90%) was prepared using Me$_2$Si(2-methyl-4-phenylindene)$_2$ in the same manner as in Preparation Example 4-2.

$^1$H NMR (CDCl$_3$): δ=7.68-7.10 (m, 16H), 7.68-6.83 (m, 18H), 6.95 (s, 2H), 2.46 (s, 6H), 2.26 (s, 6H), 1.48 (s, 3H), 1.34 (s, 6H), 1.26 (s, 3H)

The first and second transition metal compounds prepared in the above-described Preparation Examples were used to prepare hybrid catalyst compositions according to Examples of the present invention as follows.

Preparation of Hybrid Catalyst Composition

Example 1

Since the first and second transition metal compounds and methylaluminumoxane (MAO), which is a co-catalyst, lose their activities when they react with water or oxygen in air, all experiments were carried out using a glove box or Schlenk technique under a nitrogen atmosphere. A reactor (e.g., 10 L supported-catalyst reactor) used to prepare hybrid catalyst compositions was washed to remove foreign substances, and the reactor was sealed while being dried at 110° C. for 3 hours or longer. Then, the reactor was used in a state in which water, etc. was completely removed under vacuum.

A 10 wt % methylaluminumoxane (MAO) solution (methylaluminumoxane: 1188 g), which is a co-catalyst, was added to 2.862 g of the compound of Preparation Example 1, which is the first transition metal compound, and 3.469 g of the compound of Preparation Example 8-2, which is the second transition metal compound, and stirred at room temperature for 1 hour to prepare a mixture of the first and second transition metal compounds and the co-catalyst.

300 g of silica (XPO02402), which is a carrier, was introduced into a reactor, and then 900 mL of purified toluene was added to the reactor into which silica had been introduced, followed by stirring. After completing the stirring for 1 hour, the mixture of the first and second transition metal compounds and the co-catalyst was introduced into the reactor with stirring. The reactor temperature was raised to 60° C., and then the mixture was stirred for 2 hours.

After precipitation, the supernatant was removed and the precipitate was washed with 1 L of toluene and dried under vacuum at 60° C. for 12 hours.

Example 2

Preparation was performed in the same manner as in Example 1, except that 2.389 g of the compound of Preparation Example 2 and 4.387 g of the compound of Preparation Example 8-2 were used.

Example 3

Preparation was performed in the same manner as in Example 1, except that 2.712 g of the compound of Preparation Example 3 and 3.046 g of the compound of Preparation Example 7-2 were used.

Example 4

Preparation was performed in the same manner as in Example 1, except that 2.662 g of the compound of Preparation Example 4 and 3.712 g of the compound of Preparation Example 6-2 were used.

Example 5

Preparation was performed in the same manner as in Example 1, except that 2.359 g of the compound of Preparation Example 1 and 4.357 g of the compound of Preparation Example 5-2 were used.

Example 6

Preparation was performed in the same manner as in Example 1, except that 2.329 g of the compound of Preparation Example 4 and 4.357 g of the compound of Preparation Example 8-2 were used.

Example 7

Preparation was performed in the same manner as in Example 1, except that 2.359 g of the compound of Preparation Example 1 and 4.057 g of the compound of Preparation Example 7-2 were used.

Example 8

Preparation was performed in the same manner as in Example 1, except that 2.359 g of the compound of Preparation Example 2 and 4.157 g of the compound of Preparation Example 5-2 were used.

Example 9

Preparation was performed in the same manner as in Example 1, except that 2.159 g of the compound of Preparation Example 2 and 3.357 g of the compound of Preparation Example 6-2 were used.

Example 10

Preparation was performed in the same manner as in Example 1, except that 2.659 g of the compound of Preparation Example 3 and 4.557 g of the compound of Preparation Example 5-2 were used.

Comparative Example 1

Preparation was performed in the same manner as in Example 1, except that the compound of Preparation Example 1 and (nBuCp)$_2$ZrCl$_2$ were used.

Comparative Example 2

Preparation was performed in the same manner as in Example 1, except that (nBuCp)$_2$ZrCl$_2$ and the compound of Preparation Example 8-2 were used.

Comparative Example 3

Preparation was performed in the same manner as in Example 1, except that the compound of Preparation Example 1 and Me$_2$Si(Me$_4$Cp)(NtBu)TiCl$_2$ were used.

Comparative Example 4

Preparation was performed in the same manner as in Example 1, except that 6.214 g of the compound of Preparation Example 8-2 was used.

The first and second transition metal compounds, co-catalysts, and carriers used in Examples 1 to 10 and Comparative Examples 1 to 4 are shown in Table 1 below (preparation of hybrid catalyst composition).

TABLE 1

| Section | First transition metal compound | Second transition metal compound | Co-catalyst | Carrier |
|---|---|---|---|---|
| Example 1 | Preparation Example 1 ([Indenyl(cyclopentadienyl)]ZrCl$_2$: 2.862 g | Preparation Example 8-2 Me$_2$Si(2-methyl-4-phenyl indenyl)$_2$ZrCl$_2$: 3.469 g | Methylaluminum oxane: 1188 g | Silica (XPO2402) 300 g |
| Example 2 | Preparation Example 2 [2-methyl benzeindenyl (cyclopentadienyl)]ZrCl$_2$: 2.389 g | Preparation Example 8-2 Me$_2$Si(2-methyl-4-phenyl indenyl)$_2$ZrCl$_2$: 4.387 g | Methylaluminum oxane: 1188 g | Silica (XPO2402) 300 g |
| Example 3 | Preparation Example 3 [2-phenyl benzeindenyl (tetramethylcyclopentadienyl)]ZrCl$_2$: 2.712 g | Preparation Example 7-2 Me$_2$Si{2-methyl-4-(2-naphthyl)}$_2$ZrCl$_2$: 3.046 g | Methylaluminum oxane: 1188 g | Silica (XPO2402) 300 g |
| Example 4 | Preparation Example 4 [fluorenyl (cyclopentadienyl)]ZrCl$_2$: 2.662 g | Preparation Example 6-2 Me$_2$Si{2-methyl-4-(1-naphthyl)}$_2$ZrCl$_2$: 3.712 g | Methylaluminum oxane: 1188 g | Silica (XPO2402) 300 g |
| Example 5 | Preparation Example 1 [Indenyl(cyclopentadienyl)]ZrCl$_2$: 2.359 g | Preparation Example 5-2 Me$_2$Si(2-methyl-4,5-benzoindenyl)$_2$ZrCl$_2$: 4.357 g | Methylaluminum oxane: 1188 g | Silica (XPO2402) 300 g |
| Example 6 | Preparation Example 4 [fluorenyl (cyclopentadienyl)]ZrCl$_2$: 2.329 g | Preparation Example 8-2 Me$_2$Si(2-methyl-4-phenyl indenyl)$_2$ZrCl$_2$: 4.357 g | Methylaluminum oxane: 1188 g | Silica (XPO2402) 300 g |
| Example 7 | Preparation Example 1 [Indenyl(cyclopentadienyl)]ZrCl$_2$: 2.359 g | Preparation Example 7-2 Me$_2$Si{2-methyl-4-(2-naphthyl)}$_2$ZrCl$_2$: 4.057 g | Methylaluminum oxane: 1188 g | Silica (XPO2402) 300 g |
| Example 8 | Preparation Example 2 [2-methyl benzeindenyl (cyclopentadienyl)]ZrCl$_2$: 2.359 g | Preparation Example 5-2 Me$_2$Si(2-methyl-4,5-benzoindenyl)$_2$ZrCl$_2$: 4.157 g | Methylaluminum oxane: 1188 g | Silica (XPO2402) 300 g |
| Example 9 | Preparation Example 2 [2-methyl benzeindenyl (cyclopentadienyl)]ZrCl$_2$: 2.159 g | Preparation Example 6-2 Me$_2$Si{2-methyl-4-(1-naphthyl)}$_2$ZrCl$_2$: 3.357 g | Methylaluminum oxane: 1188 g | Silica (XPO2402) 300 g |
| Example 10 | Preparation Example 3 [2-phenyl benzeindenyl (tetramethylcyclopentadienyl)]ZrCl$_2$: 2.659 g | Preparation Example 5-2 Me$_2$Si(2-methyl-4,5-benzoindenyl)$_2$ZrCl$_2$: 4.557 g | Methylaluminum oxane: 1188 g | Silica (XPO2402) 300 g |
| Comparative Example 1 | Preparation Example 1 [Indenyl(cyclopentadienyl)]ZrCl$_2$: 2.862 g | (nBuCp)$_2$ZrCl$_2$: 3.469 g | Methylaluminum oxane: 1188 g | Silica (XPO2402) 300 g |
| Comparative Example 2 | (nBuCp)$_2$ZrCl$_2$: 2.862 g | Preparation Example 8-2 Me$_2$Si(2-methyl-4-phenyl indenyl)$_2$ZrCl$_2$: 3.469 g | Methylaluminum oxane: 1188 g | Silica (XPO2402) 300 g |
| Comparative Example 3 | Preparation Example 1 [Indenyl(cyclopentadienyl)]ZrCl$_2$: 2.862 g | Me$_2$Si(Me$_4$Cp)(NtBu)TiCl$_2$: 3.469 g | Methylaluminum oxane: 1188 g | Silica (XPO2402) 300 g |
| Comparative Example 4 | | Preparation Example 8-2 Me$_2$Si(2-methyl-4-phenyl indenyl)$_2$ZrCl$_2$: 6.214 g | Methylaluminum oxane: 1188 g | Silica (XPO2402) 300 g |

The hybrid catalyst compositions according to Examples 1 to 10 and Comparative Examples 1 to 4 were used to prepare ethylene-alpha-olefin copolymers, which are polyolefins, as follows.

Preparation of Polyolefin

Example 11

The hybrid catalyst composition obtained in Example 1 was introduced into a continuous fluidized bed reactor for gas process to prepare a polyolefin. Ethylene was used as a monomer and 1-hexene was used as a co-monomer. An ethylene pressure inside the reactor was approximately 14 bar to 15 bar, and a polymerization temperature was maintained at 80° C. to 90° C.

Examples 12 to 20

The hybrid catalyst compositions according to Examples 2 to 10 were used to prepare polyolefins of Examples 12 to 20, respectively. In this regard, methods, except for the hybrid catalyst compositions, were performed in the same manner as in Example 11 to prepare the polyolefins (ethylene-alpha-olefin copolymers).

Comparative Examples 5 to 8

The hybrid catalyst compositions according to Comparative Examples 1 to 4 were used to prepare polyolefins of Comparative Examples 5 to 8, respectively. In this regard, methods, except for the hybrid catalyst compositions, were performed in the same manner as in Example 11 to prepare the polyolefins.

In Table 2 below (Preparation of polyolefin), the hybrid catalyst compositions used in Examples 11 to 20 and Comparative Examples 5 to 8, and an ethylene pressure, a molar ratio of hydrogen/ethylene, and a molar ratio of 1-hexene/ethylene in each of the polymerization reactions are shown. The ethylene was used as a monomer of polyolefin, and 1-hexene was used as a co-monomer. The hydrogen was used as a chain transfer agent to control a molecular weight of the polyolefin during reaction.

TABLE 2

| Section | Hybrid catalyst composition | Ethylene pressure (bar) | Molar ratio (%) of hydrogen/ ethylene | Molar ratio (%) of 1-hexene/ ethylene |
|---|---|---|---|---|
| Example 11 | Example 1 | 15.0 | 0.125 | 0.159 |
| Example 12 | Example 2 | 15.2 | 0.115 | 0.168 |
| Example 13 | Example 3 | 14.7 | 0.082 | 0.31 |
| Example 14 | Example 4 | 14.4 | 0.048 | 0.3 |
| Example 15 | Example 5 | 15.0 | 0.164 | 0.102 |
| Example 16 | Example 6 | 14.1 | 0.108 | 0.33 |
| Example 17 | Example 7 | 15.2 | 0.026 | 0.31 |
| Example 18 | Example 8 | 15.1 | 0.065 | 0.233 |
| Example 19 | Example 9 | 15.2 | 0.118 | 0.120 |
| Example 20 | Example 10 | 15.1 | 0.087 | 0.114 |
| Comparative Example 5 | Comparative Example 1 | 15.1 | 0.027 | 0.69 |
| Comparative Example 6 | Comparative Example 2 | 15.05 | 0.116 | 0.36 |
| Comparative Example 7 | Comparative Example 3 | 15.2 | 0.13 | 0.22 |
| Comparative Example 8 | Comparative Example 4 | 15.1 | 0.118 | 0.23 |

Methods of Measuring Physical Properties of Examples 11 to 20 and Comparative Examples 5 to 8

(1) Density was measured in accordance with ASTM 1505.

(2) Melt index ($I_2$, 2.16 kg), an amount that is extruded for 10 minutes under a load of 2.16 kg, was measured at a temperature of 190° C. in accordance with ASTM 1238.

(3) Melt flow index (MFR) is a rate obtained by dividing a flow index ($I_{21}$, load of 21.6 kg) by melt index ($I_2$, load of 2.16 kg).

(4) Molecular weight and molecular weight distribution (PDI) were obtained by measuring an average molecular weight using gel permeation chromatography-FTIR (GPC-FTIR).

(5) Impact strength was measured in accordance with ASTM D256.

(6) Environmental Stress Cracking Resistance

Environmental stress cracking resistance (hereinafter, referred to as ESCR) was evaluated in accordance with ASTM D1693 by immersing 10 samples in a 10% IGEPAL solution at 50° C. and then examining whether failure (crack occurrence) was observed in 5 samples.

(7) Melt tension measurement was conducted on a Gottfert Rheotens attached to a Gottfert Rheotester 2000 capillary rheometer.

(8) HMI (High Molecular Index)

HMI represents a ratio of a Z average molecular weight ($M_z$) to a weight average molecular weight ($M_w$), as determined by gel permeation chromatography, and a higher value means that a larger amount of a high-molecular-weight body exists in a polymer.

HMI=Z average molecular weight ($M_z$)/weight average molecular weight ($M_w$)

(9) BOCDI (Broad Orthogonal Comonomer Distribution Index)

BOCDI represents a distribution of short chain branches (SCBs), and a positive (+) value indicates that SCBs are concentrated in a high-molecular-weight body. BOCDI was obtained with reference to a method described in Korean Patent No. 10-2012-0038798.

Results of measuring physical properties of Examples 11 to 20 and Comparative Examples 5 to 8 are shown in Table 3 below (confirmation of physical properties of polyolefin).

TABLE 3

| Section | Catalytic activity (gPE/ gCat) | Melt index ($I_2$, 2.16 kg) | Melt flow rate (MFR) | BOCDI | HMI (High Molecular Index) | Density |
|---|---|---|---|---|---|---|
| Example 11 | 5000 | 2.6 | 43.0 | 0.69 | 4.7 | 0.9518 |
| Example 12 | 5600 | 0.95 | 74.5 | 0.78 | 5.1 | 0.9523 |
| Example 13 | 5800 | 0.31 | 64.0 | 0.81 | 5.6 | 0.9424 |
| Example 14 | 5900 | 0.29 | 46.4 | 0.47 | 5.7 | 0.9403 |
| Example 15 | 5100 | 2.5 | 44.0 | 0.58 | 4.5 | 0.9560 |
| Example 16 | 6400 | 2.09 | 97.3 | 0.39 | 4.2 | 0.9237 |
| Example 17 | 5400 | 0.76 | 35.0 | 0.51 | 5.0 | 0.9373 |
| Example 18 | 5150 | 0.53 | 38.8 | 0.68 | 5.4 | 0.9433 |
| Example 19 | 5050 | 3.65 | 47.5 | 0.37 | 4.0 | 0.9567 |
| Example 20 | 4930 | 1.2 | 52.9 | 0.48 | 4.4 | 0.9536 |
| Mean value of Examples | 5433 | 1.488 | 54.34 | 0.576 | 4.86 | 0.9457 |
| Comparative Example 5 | 3800 | 0.83 | 16.7 | −0.12 | 2.2 | 0.9361 |
| Comparative Example 6 | 4500 | 0.75 | 21.2 | −0.08 | 2.1 | 0.9406 |
| Comparative Example 7 | 1500 | 0.70 | 18.0 | −0.01 | 2.5 | 0.9423 |
| Comparative Example 8 | 1600 | 1.09 | 22.3 | −0.01 | 2.0 | 0.9337 |
| Mean value of Comparative Examples | 2850 | 0.8425 | 19.55 | −0.055 | 2.2 | 0.9382 |

FIG. 1 is a graph of GPC-IR analysis to confirm co-monomer distributions of copolymers prepared in Examples 13, 14, and 18, and FIG. 2 is a graph of GPC-IR analysis to confirm co-monomer distributions of copolymers prepared in Comparative Examples 5 and 8.

Referring to FIGS. 1 and 2 and Tables 1 to 3, it was confirmed that the hybrid catalyst compositions according to Examples of the present invention exhibit higher catalytic activities than those of Comparative Examples.

In FIGS. 1 and 2, the red color represents the co-monomer distribution, and the blue color represents the molecular weight distribution. FIG. 1 shows a large distribution of a high-molecular-weight body, indicating excellent mechanical properties, whereas FIG. 2 shows a large distribution of co-monomers in a low-molecular-weight body.

A mean value of activities of the catalysts used in Examples 11 to 20 was 5433 gPE/gCat, whereas a mean value of activities of the catalysts used in Comparative Examples 5 to 8 was 2850 gPE/gCat, indicating that when the hybrid catalyst compounds according to the present invention are used, catalytic activities were increased by approximately twice or more.

Further, a mean value of melt flow rates (MFR) of Examples 11 to 20 was 54.34, whereas a mean value of Comparative Examples 5 to 8 was 19.55, indicating that the mean value of the polyolefins prepared using the hybrid catalyst mixture according to the present invention was twice or more compared to that of Comparative Examples. The melt flow rate is used as a measure of flowability of a polymer. As the molecular weight increases, the melt flow rate value decreases, and as the melt flow rate value increases, flowability (processability) improves and the molecular weight decreases. That is, it was confirmed that the polyolefins prepared according to Examples of the present invention have excellent processability, as compared with those prepared according to Comparative Examples.

BOCDI is a value that represents a distribution of short chain branches (SCBs) in a polyolefin, and a positive (+) value indicates that SCBs are concentrated in a high-molecular-weight body. All of the polyolefins prepared according to Examples of the present invention had positive (+) values, whereas all of the polyolefins prepared according to Preparation Examples had negative (−) values. That is, it was confirmed that the polyolefins prepared using the hybrid catalyst compositions according to Examples of the present invention have a large distribution of co-monomers in high-molecular-weight bodies.

HMI may greatly influence mechanical properties and processability of a polyolefin. An HMI of 3.5 or more indicates formation of a large amount of high-molecular-weight bodies, which improves mechanical properties of the polyolefin, such as melt tension, environmental stress cracking resistance, and impact strength. In contrast, when HMI is more than 1.0, processability is remarkably deteriorated during processing, which may cause a problem in that a product has very poor appearance. Therefore, polyolefins according to Examples of the present invention are preferably an ethylene-alpha-olefin copolymer having an HMI of 3.5 or more to 10 or less. When the polyolefin has an HMI of less than 3.5, environmental stress cracking resistance and melt tension are deteriorated, and when the polyolefin has an HMI of more than 10, processability is deteriorated.

The polyolefin of Comparative Example 7 was prepared using the hybrid catalyst composition according to Comparative Example 3, and the hybrid catalyst composition according to Comparative Example 3 is composed of [indenyl(cyclopentadienyl)]ZrCl$_2$ of Preparation Example 1 and Me$_2$Si(Me$_4$Cp)(NtBu)TiCl$_2$. That is, although a mixture of two kinds of transition metal compounds is used, when the catalyst is composed of the two compounds, each compound having a symmetric structure centering on the transition metal Ti, such as Preparation Example 1 and Me$_2$Si(Me$_4$Cp)(NtBu)TiCl$_2$, the mixture's catalytic activity is low.

It was confirmed that Comparative Example 6, having a structure different from that of the second transition metal compound (see Formula 2), has relatively good catalytic activity, but its processability is poor, a high-molecular-weight body is small, and co-monomers are concentrated in the low-molecular-weight body, and thus melt tension and stress cracking resistance are low. Therefore, commercial application of Comparative Example 6 is not easy.

Table 4 below shows results of comparing physical properties between the polyolefins according to Examples of the present invention and commercially available HDPE. It was confirmed that all of the polyolefins according to Examples of the present invention have excellent processability and mechanical properties, as compared with commercially available HDPE. It was also confirmed that the polyolefins according to Examples of the present invention have a more excellent melt index (I$_2$) and melt flow rate (MFR), which are a measure of processability.

The polyolefins according to Examples of the present invention are ethylene-alpha-olefin copolymers including a large amount of a high-molecular-weight body, thereby having excellent stress cracking resistance and impact strength, and they also have distribution of a large amount of co-monomers in the high-molecular-weight body, thereby having an excellent melt index (I$_2$) and melt flow rate (MFR).

As in Table 4, it was confirmed that the polyolefins according to Examples of the present invention have excellent processability and mechanical properties, as compared with commercially available HDPE. The melt index (I$_2$) and the melt flow rate (MFR), which are a measure of processability, showed that the olefin copolymers of the present invention have excellent processability. The olefin copolymers of the present invention have a large amount of a high-molecular-weight body, thereby having excellent stress cracking resistance and impact strength. FIG. 3 also showed that a large amount of co-monomers are distributed in the high-molecular-weight body, and the high-molecular-weight body exists, and therefore, melt tension is excellent.

FIG. 3 is a graph of melt tension analysis of Example 11 and commercial products. As the commercial products, product A (HDPE C910C, density of 0.945 g/cm$^3$, melt index of 2.0 g/10 min), product B (HDPE 7303, density of 0.956 g/cm$^3$, melt index of 2.0 g/10 min), and product C (HDPE ME2500, density of 0.950 g/cm$^3$, melt index of 2.0 g/10 min), which are commonly used in the art, were used. Referring to Table 4 (confirmation of characteristics of polyolefins according to the present invention and commercially available polyolefins) and FIG. 3, it was confirmed that the polyolefins according to the present invention have an impact strength of 20 kJ/m$^2$ or more, as measured in accordance with ASTM D256, and a melt tension at 190° C. of 0.06 F,N or more.

Referring to FIG. 3, it was confirmed that Example 11 according to the present invention has a higher F,N value than commercially available product A, product B, and product C. A higher F,N value indicates a higher melt tension, which makes the process conditions broad, indicating excellent processability under various conditions. That is, the polyolefin according to one Example of the present invention has a higher F,N value than commercial products commonly used in the art, and therefore, the polyolefin is advantageous in that it may be processed under various conditions, thereby being easily applied to a variety of fields.

TABLE 4

| Section | Melt index (I$_2$, 2.16 kg) | Melt flow rate (MFR) | Density (g/cm$^3$) | ESCR (h) | Impact strength (kJ/m$^2$) | HMI (High Molecular Index) |
|---|---|---|---|---|---|---|
| Example 11 | 2.6 | 43 | 0.9518 | 17 | 22 | 4.7 |
| Example 15 | 2.5 | 44 | 0.9560 | 16 | 20 | 4.5 |
| Product A | 2.4 | 29 | 0.9556 | 11 | 17.5 | 3.4 |
| Product B | 2.1 | 37 | 0.9523 | 14 | 14 | 2.7 |
| Product C | 2.1 | 29 | 0.9538 | 12 | 19 | 2.2 |

As described above, the hybrid catalyst compositions according to Examples of the present invention may exhibit excellent activity in the preparation of a high-density polyolefin and may have a broad molecular weight distribution, thereby preparing polyolefin resins with excellent processability. Further, the polyolefin prepared using the hybrid catalyst composition has a high co-monomer content in a high-molecular-weight body and a low co-monomer content in a low-molecular-weight body, thereby having a single molecular weight distribution with excellent impact strength, flexural strength, environmental stress cracking resistance (ESCR), and melt tension. Further, due to a broad molecular weight distribution, the polyolefins according to Examples of the present invention show a low extrusion load during processing and a large amount of extrusion, and thus the polyolefins are excellent in productivity.

The polyolefins according to Examples of the present invention may be usefully applied to the production of pipes with superior pressure resistance, bottle caps or containers with superior processability, etc.

The invention claimed is:

1. A hybrid catalyst composition comprising a first transition metal compound represented by the following Formula 1 and a second transition metal compound represented by the following Formula 2:

[Formula 1]

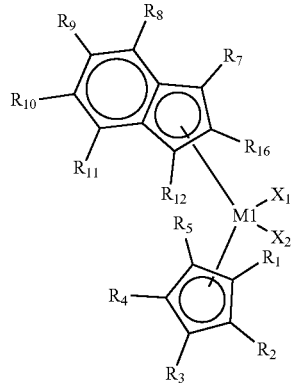

wherein the first transition metal compound represented by Formula 1 is any one or more of the following structural formulae:

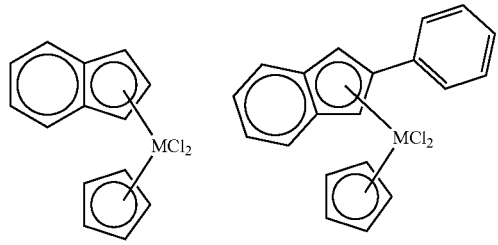

-continued

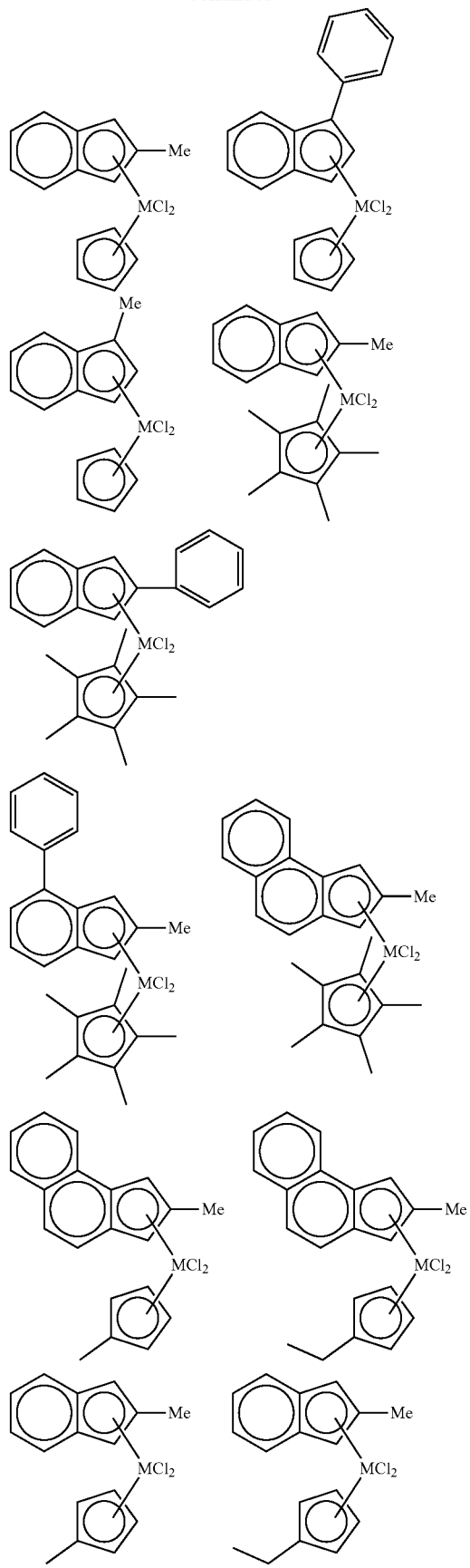

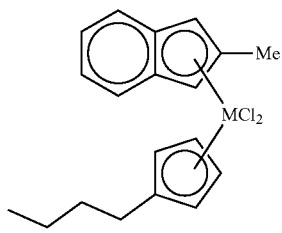
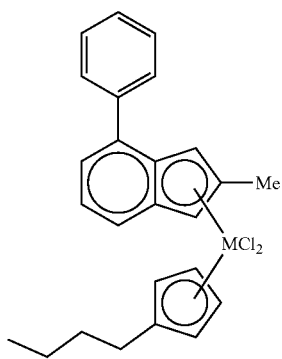
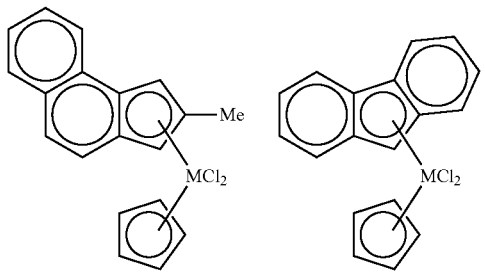
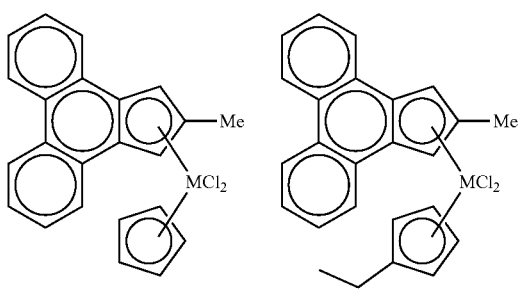
wherein M is any one of hafnium (Hf), zirconium (Zr), and titanium (Ti), and Me is methyl; and
[Formula 2]
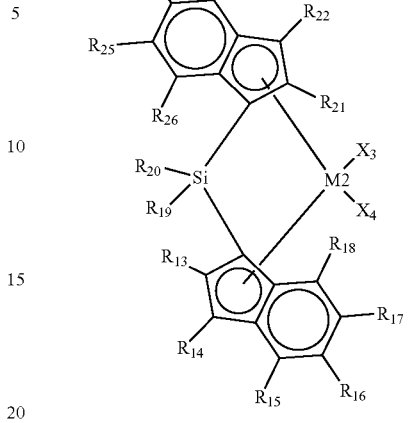
wherein the second transition metal compound represented by Formula 2 is any one or more of the following structural formulae:
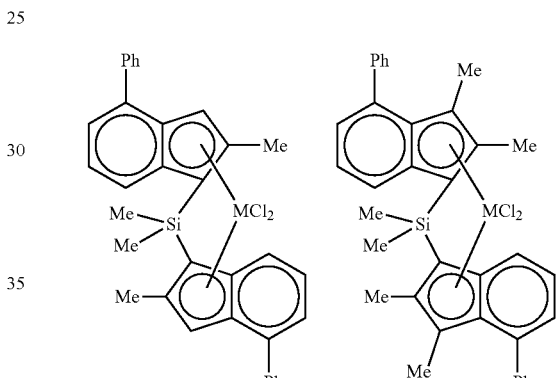
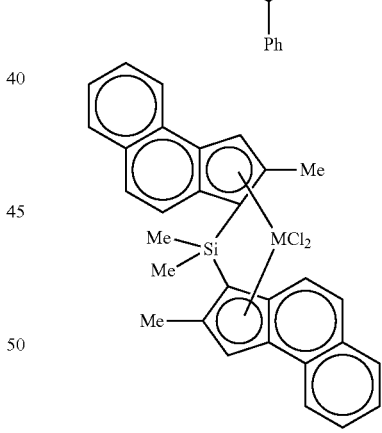
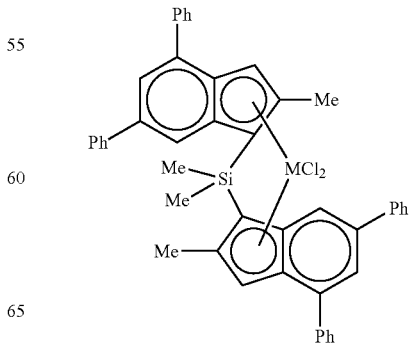

-continued
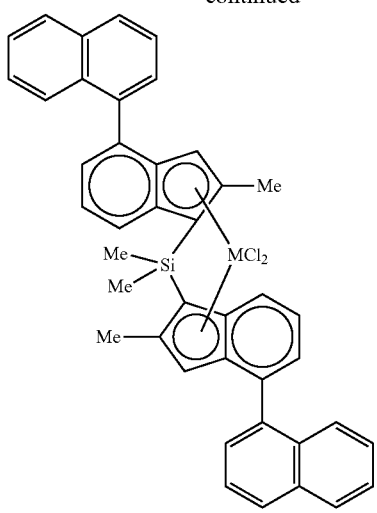
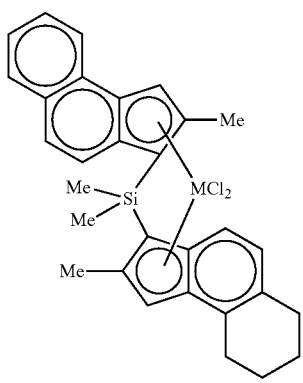
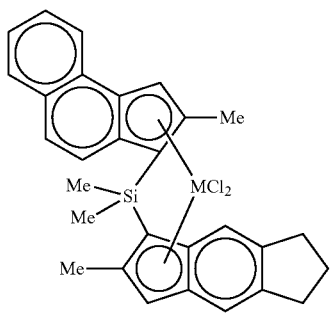
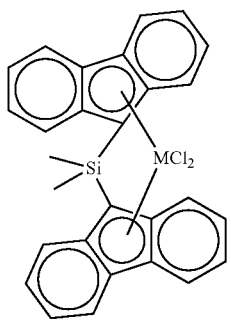
-continued
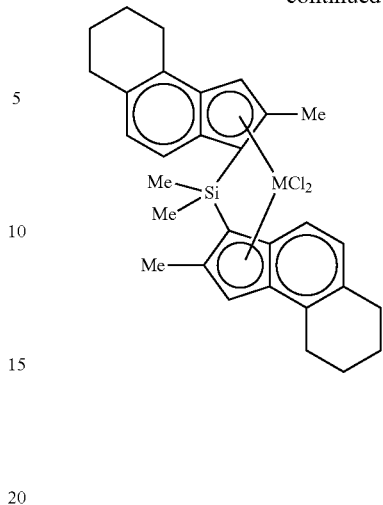
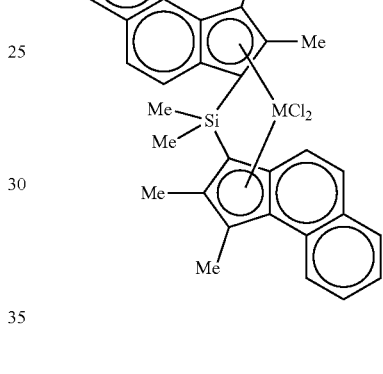
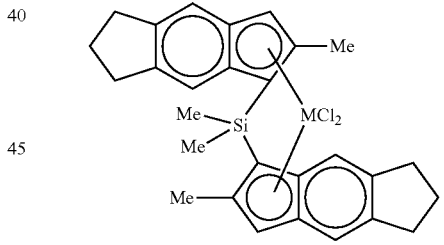
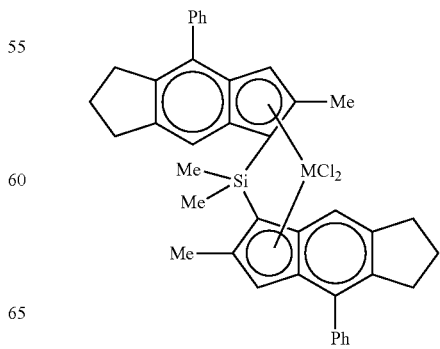

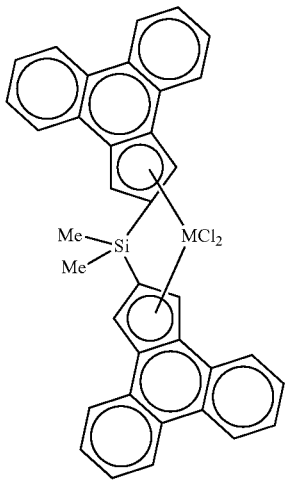
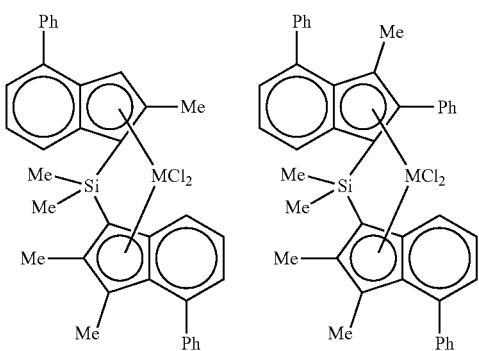
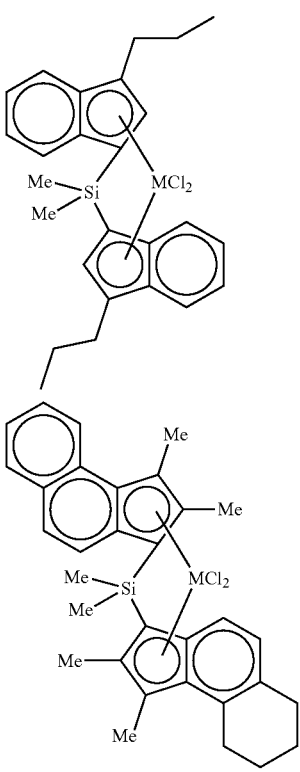
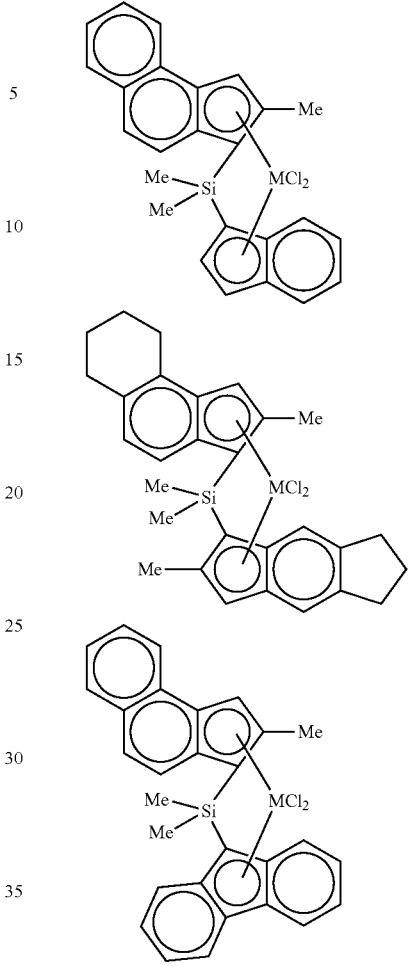

wherein M is any one of hafnium (Hf), zirconium (Zr), and titanium (Ti), Me is a methyl group, and Ph is a phenyl group.

2. The hybrid catalyst composition of claim 1, wherein the first transition metal compound has a structure in which ligands are asymmetrically connected to one side and another side of the transition metal (M1), and the second transition metal compound has a structure in which ligands are symmetrically connected to one side and another side of the transition metal (M2).

3. The hybrid catalyst composition of claim 1, further comprising a co-catalyst composed of any one or more of the following Formulae 3 to 6:

$$\left[ \begin{array}{c} R^{27} \\ | \\ Al-O \end{array} \right]_a$$ [Formula 3]

wherein $R^{27}$ is a halogen atom, a hydrocarbon group having 1 to 20 carbon atoms, or a halogen-substituted hydrocarbon group having 1 to 20 carbon atoms, and a is an integer of 2 or more;

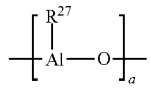 [Formula 4]

wherein Z is aluminum (Al) or boron (B), $R_{28}$ is a halogen atom, a hydrocarbon group having 1 to 20 carbon atoms, a halogen-substituted hydrocarbon group having 1 to 20 carbon atoms, or an alkoxy group having 1 to 20 carbon atoms;

$$[L-H]^+[Z(B)_4]^- \quad \text{[Formula 5]}$$

$$[L]^+[Z(B)_4]^- \quad \text{[Formula 6]}$$

wherein L is a neutral or cationic Lewis acid,

Z is a Group 13 element of the periodic table of elements, and

B is a substituted or unsubstituted aryl group having 6 to 20 carbon atoms or a substituted or unsubstituted alkyl group having 1 to 20 carbon atoms.

4. The hybrid catalyst composition of claim 3, further comprising a carrier that supports the first and second transition metal compounds and the co-catalyst.

5. The hybrid catalyst composition of claim 4, wherein a weight ratio of the total weight of the transition metals (M1, M2) in the first and second transition metal compounds to the carrier is 1:100 to 1:500.

6. The hybrid catalyst composition of claim 4, wherein the carrier has an average particle size of 10 μm to 250 μm, a fine pore volume of 0.1 cc/g to 10 cc/g, and a specific surface area of 1 m$^2$/g to 1000 m$^2$/g.

7. The hybrid catalyst composition of claim 3, wherein the compound represented by Formula 3 includes any one or more of methylaluminoxane, ethylaluminoxane, isobutylaluminoxane, and butylaluminoxane.

8. The hybrid catalyst composition of claim 3, wherein the compound represented by Formula 4 includes any one or more of trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron.

9. The hybrid catalyst composition of claim 3, wherein the compound represented by Formula 5 or Formula 6 includes any one or more of methyldioctadecylammonium tetrakis(pentafluorophenyl)borate([HNMe(C$_{18}$H$_{37}$)$_2$]$^+$[B(C$_6$F$_5$)$_4$]$^-$), trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis(o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetrakis(phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbonium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl)aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate.

10. The hybrid catalyst composition of claim 1, wherein the hybrid catalyst composition is used in the preparation of ethylene-alpha-olefin copolymers.

11. A method of preparing a polyolefin comprising a step of polymerizing one or more olefin monomer(s) in the presence of the hybrid catalyst composition of claim 1, wherein the polyolefin has a density of 0.910 g/cm$^3$ to 0.960 g/cm$^3$, a molecular weight distribution ($M_w/M_n$) of 3 to 10, a melt index ($I_2$) under 2.16 kg of 0.2 to 100, and a melt flow rate (MFR: $I_{21}/I_2$) of 25 or more.

12. The method of claim 11, wherein the olefin monomers include ethylene and one or more co-monomer selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

13. The method of claim 11, wherein the polyolefin includes an ethylene-alpha-olefin copolymer having HMI (high molecular index) of 3.5 or more to 10 or less.

14. The method of claim 11, wherein the polyolefin has a melt tension at 190° C. of 0.06 F,N or more.

* * * * *